United States Patent
Ciancio-Bunch et al.

(10) Patent No.: US 9,785,788 B2
(45) Date of Patent: Oct. 10, 2017

(54) SYSTEM AND METHOD FOR CONTROLLING ACCESS TO ASPECTS OF AN ELECTRONIC MESSAGE CAMPAIGN

(71) Applicant: SALESFORCE.COM, INC., San Francisco, CA (US)

(72) Inventors: James Michael Ciancio-Bunch, Indianapolis, IN (US); Matt Beard, Indianapolis, IN (US); D. Thomas Waltz, Carmel, IN (US); Richard W. Jamison, Indianapolis, IN (US); Jack Fisher, Columbus, IN (US); Jeff Middlesworth, Fishers, IN (US)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

(21) Appl. No.: 14/572,381

(22) Filed: Dec. 16, 2014

(65) Prior Publication Data

US 2015/0100604 A1     Apr. 9, 2015

Related U.S. Application Data

(62) Division of application No. 13/254,876, filed as application No. PCT/US2010/026552 on Mar. 8, 2010, now Pat. No. 8,949,351.

(Continued)

(51) Int. Cl.
*G06F 15/16*     (2006.01)
*G06F 21/62*     (2013.01)
(Continued)

(52) U.S. Cl.
CPC .... *G06F 21/6218* (2013.01); *G06F 17/30424* (2013.01); *G06Q 10/107* (2013.01); *G06Q 30/02* (2013.01)

(58) Field of Classification Search
CPC .............. H04L 51/00; G06F 17/30861; G06F 21/6218; G06F 17/30424; G06Q 10/107; G06Q 30/02
(Continued)

(56) References Cited

U.S. PATENT DOCUMENTS 7,640,322 B2 *  12/2009  Wendkos .............. H04L 12/585
                                                       709/206
7,643,322 B1 *   1/2010  Varga ................... H02M 3/156
                                                        307/66

(Continued)

FOREIGN PATENT DOCUMENTS

JP    2001351008    12/2001
JP    2002092021     3/2002
(Continued)

OTHER PUBLICATIONS

Extended European Search Report mailed May 9, 2014 in corresponding European Application No. 10749445.2.

(Continued)

*Primary Examiner* — Viet Vu
(74) *Attorney, Agent, or Firm* — Morris & Kamlay LLP

(57) ABSTRACT

A system for controlling access within an enterprise to information associated with recipients of an electronic message campaign of the enterprise sent to a plurality of recipient devices wherein the enterprise includes hierarchically structured Business Units having an enterprise level Business Unit at the highest level and a plurality of second level Business Units and an enterprise system communicatively coupled to a network and including an enterprise level device communicatively coupled to a plurality of second level devices includes a server and an electronic message engine The server is configured to assign an enterprise account to the enterprise system and to allow the enterprise level device to communicate selected portions of the recipi- (Continued)

ent list. The electronic message engine is configured to generate electronic messages within a message campaign for sending to recipients identified by each of the second level devices from the selected portions of the recipient list.

18 Claims, 18 Drawing Sheets

Related U.S. Application Data

(60) Provisional application No. 61/158,060, filed on Mar. 6, 2009.

(51) Int. Cl.
*G06Q 10/10* (2012.01)
*G06Q 30/02* (2012.01)
*G06F 17/30* (2006.01)

(58) Field of Classification Search
USPC .............................. 709/204, 206, 217, 219
See application file for complete search history.

(56) References Cited

U.S. PATENT DOCUMENTS

| | | | |
|---|---|---|---|
| 8,037,140 B2 | 10/2011 | Delgaudio et al. | |
| 8,244,672 B1* | 8/2012 | Thenthiruperai | H04W 4/001 |
| | | | 707/621 |
| 8,280,913 B2 | 10/2012 | Bergin | |
| 2002/0198973 A1 | 12/2002 | Besaw | |
| 2003/0055757 A1 | 3/2003 | Pfiffner et al. | |
| 2003/0117437 A1 | 6/2003 | Cook et al. | |
| 2005/0010470 A1 | 1/2005 | Marino | |
| 2005/0198121 A1 | 9/2005 | Daniels et al. | |
| 2005/0228824 A1 | 10/2005 | Gattuso et al. | |
| 2006/0015400 A1* | 1/2006 | Pinotti | G06Q 30/02 |
| | | | 705/14.41 |
| 2007/0192121 A1 | 8/2007 | Routson | |
| 2008/0040442 A1* | 2/2008 | Fieldman | G06Q 10/10 |
| | | | 709/207 |
| 2009/0006467 A1 | 1/2009 | Visscher | |
| 2009/0144201 A1 | 6/2009 | Gierkink et al. | |
| 2010/0305988 A1 | 12/2010 | Agarwal et al. | |

FOREIGN PATENT DOCUMENTS

| | | |
|---|---|---|
| JP | 2004171151 | 6/2004 |
| JP | 2005242680 A | 9/2005 |
| JP | 2007079694 A | 3/2007 |
| JP | 2007148963 A | 6/2007 |

OTHER PUBLICATIONS

International Search Report, issued Apr. 23, 2010 in corresponding International Application No. PCT/US10/26552.
Written Opinion, issued Apr. 23, 2010 in corresponding International Application No. PCT/US10/26552.
Japanese Office Action dated Jun. 1, 2015 issued in JP Application No. 2014-108706.
Japanese Notice of Allowance dated Sep. 11, 2015 issued in JP Application 2014-108706.
Japanese Office Action dated Sep. 13, 2016 issued in JP Application No. 2015-164425.

\* cited by examiner

Roles > Content Creator

Save   Delete   Cancel

Properties
Name (required)
[ Content Creator ]

External Key
[ SYS_DEF_CONTENT ]

Description
[ Content Creator ]

Permissions
A permission is one of the following states: allowed, not allowed, denied,
"More instruction needed"

|  | Allow | Deny |
|---|---|---|
| Content | ☑ | ☐ |
| Email | ☐ | ☐ |
| Create | ☐ | ☐ |
| View | ☐ | ☐ |
| Update | ☐ | ☐ |
| Delete | ☐ | ☐ |
| Preview | ☐ | ☐ |

Fig. 4

Subscription Center

| Profile Center | |
|---|---|
| Subscription Center | On this Page<br>→ Available Publications<br>→ Unsubscribe From All |
| Help | |
| | Available publications<br>To unsubscribe from any publication, just uncheck the box and click the update button below. To subribe to new publications, just check the appropriate box and click the update button below. |
| | ☑ eNewsletter<br>An occasional email newsletter from DuPont about news, events and industry knowledge |
| | ☐ Product Announcements<br>Announcements about the latest product from DuPont |
| | ☐ Sales Communications<br>Information from your local sales associate |
| | ☐ Canadian Leadership Foundation<br>Communicatios around news and events about the Canadian Leadership Foundation |
| | (Update)   ↑Top of Page |
| | Unscribe From All<br>If you wish to unscribe from ALL publications from DuPont, click the box and click the update button below.<br>I no longer wish to recieve any future publications. |
| | (Update)   ↑Top of page |

EnterpriseAttribute Table

| COLUMN NAME | DATA TYPE | ALLOW NULLS | DESCRIPTION |
|---|---|---|---|
| SUBSCRIBER ID | BIG INT | NO | |
| <NAME> | <DATA TYPE> | <NULLABLE> | SEPERATE COLUMNS FOR EACH ATTRIBUTE. |

Fig. 8 sinessUnitFilterDefinition Table

| COLUMN NAME | DATA TYPE | ALLOW NULLS | DESCRIPTION |
|---|---|---|---|
| CLIENT ID | BIG INT | NO | FOR DTU. |
| ENTERPRISE ID | BIG INT | NO | |
| FILTER DEFINITION XML | BIG INT | YES | |
| SQL STATEMENT | INT | YES | |
| CREATED DATE UTC | DATE/TIME | NO | |
| CREATED BY | BIG INT | NO | |
| MODIFIED DATE UTC | DATE/TIME | NO | |
| MODIFIED BY | BIG INT | NO | |
| STAMP | TIME STAMP | NO | FOR DTU. |

Fig. 9

Data Population Script for Object ID Column

```
SET ANSI_NULLS ON
SET QUOTED_IDENTIFIER ON
GO

SET NOCOUNT ON
SET TRANSACTION ISOLATION LEVEL READ UNCOMMITTED

DECLARE     @BatchSize INT
            @MaxID INT
            @MinID Int

SELECT      @BatchSize = 5000

SELECT      @MaxID = MAX (pkTemplateShellID), @MinID = MIN(pkTemplateShellID) FROM
dbo.tblTemplateShells --populate tblTemplateShells ObjectID
WHILE @MinID < @MaxID
BEGIN
            UPDATE T SET
            T. ObjectID = NEWID()
            FROM dbo. tblTemplateShells AS T
            WHERE pkTemplateShellID >= @MinID AND pkTemplateShellID <= (@MinId +
    @BatchSize) AND ObjectID IS NULL SELECT @MinID = @MinID + @BatchSize

END

--picks up any last records added after this process began
UPDATE T SET
T. ObjectID = NEWID()
FROM dbo.tblTemplateShells AS T
WHERE pkTemplateShellID >= @MinID AND pkTemplateShellID <= (@MinID + @BatchSize) AND
OBJECTid is null IF EXISTS (SELECT * FROM INOFRMATION_SCHEMA, (COLUMNS)
        WHERE TABLE-SCHEMA = N' dbo'
            AND TABLE_NAME = N'TBLtEMPLATEsHELLS'
            AND COLUMN_NAME – N'ObjectID'
            AND IS_NULLABLE = 'YES')

BEGIN

ALTER TABLE dbo.tblTemplateShells ALTER COLUMN ObjectID uniqueidentifier NOT NULL
END
GO
```

FIG. 10

SubscriberOptOut Table

| COLUMN NAME | DATA TYPE | ALLOW NULLS | DESCRIPTION |
|---|---|---|---|
| CLIENT ID | BIG INT | NO | |
| SUBSCRIBER ID | BIG INT | NO | |
| LIST ID | INT | YES | TB LISTS, PK LISTL D D REPRESENTS THE PUBLICATION LIST ID. NULL FOR BUSINESS UNIT. |
| UNSUB DATE UTC | DATE/TIME | NO | STORED IN UTC. |
| UNSUB REASON | NVARCHAR (100) | YES | |
| IS ACTIVE | BIT | NO | 0=SOFT DELETED, 1=ACTIVE |

Fig. 11

BusinessUnit Table

| COLUMN NAME | DATA TYPE | ALLOW NULLS | DESCRIPTION |
|---|---|---|---|
| UnscubscribeBehavior | tinyint | NO | 0=Unsubscribe from Enterprise (default) 1 = Unsubscribe from |

Fig. 12 tbLists Table

| COLUMN NAME | DATA TYPE | ALLOW NULLS | DESCRIPTION |
|---|---|---|---|
| OwnerID | bigint | NO | MemberEmployee. EmployeeID |

Fig. 13

Permissions

Specify the granular permissions for this role.

expand all | collapse all

| | Allow | Deny |
|---|---|---|
| ⊟ Content | ☐ | ☐ |
| ⊟ Email | ☐ | ☐ |
|     Create | ☑ | ☐ |
|     View | ☑ | ☐ |
|     Update | ☑ | ☐ |
|     Delete | ☐ | ☐ |
|     Preview | ☐ | ☐ |
|     Send | ☐ | ☐ |
|     Test Send | ☐ | ☐ |
|     View History | ☐ | ☐ |
|     Content Detective | ☐ | ☐ |
|     Validate | ☐ | ☐ |
|     Share | ☐ | ☐ |
| ⊞ Template | ☐ | ☐ |
| ⊞ Portfolio | ☐ | ☐ |
| ⊞ Image | ☐ | ☐ |
| ⊞ Content Area | ☐ | ☐ |
| ⊞ Document | ☐ | ☐ |
| ⊞ Survey | ☐ | ☐ |
| ⊞ Microsite | ☐ | ☐ |
| ⊞ Microsite Layout | ☐ | ☐ |
| ⊞ Coupon | ☐ | ☐ |
| ⊞ Google Ad | ☐ | ☐ |
| ⊞ Header/Footer Library | ☐ | ☐ |
| ⊞ Subscribers | ☑ | ☐ |
| ⊞ Interactions | ☑ | ☐ |
| ⊞ Tracking | ☑ | ☐ |
| ⊞ Reports | ☑ | ☐ |
| ⊞ Admin | ☑ | ☐ |

Fig. 17

SYSTEM AND METHOD FOR CONTROLLING ACCESS TO ASPECTS OF AN ELECTRONIC MESSAGE CAMPAIGN

RELATED APPLICATIONS

This application is a divisional of U.S. application Ser. No. 13/254,876, filed Nov. 1, 2011, now U.S. Pat. No. 8,949,351, which was the National Stage of International Application No. PCT/US10/26552, filed Mar. 8, 2010, which claims the benefit of U.S. Provisional Application No. 61/158,060, filed Mar. 6, 2009, and incorporates by this reference the full disclosure of such provisional application.

BACKGROUND AND SUMMARY

The disclosed system and method relate to Email campaigns wherein an enterprise provides Emails to a list of subscribers and more particularly wherein access to information regarding subscribers is controlled within the enterprise.

Many corporations, associations, groups, franchisors and other entities, referred to herein generally as enterprises, send Emails to persons who have expressed an interest in receiving Emails from such enterprises. Those persons to whom Emails are sent by entities are referred to as subscribes and may be of the type that have opted into an Email campaign from the enterprise or who have not indicated a desire to opt out of an Email campaign of the enterprise. Often such enterprises collect substantial information regarding subscribers to their Email campaigns.

Enterprises typically include different business units who have either a desire, or a need, for access to at least some information regarding the subscribers to the Email campaigns of the enterprise. Not all business units of an enterprise have the same need, desire or entitlement to access information regarding any individual subscriber. For instance, a business unit that has developed a customer relationship and obtained permission to send Emails from an Email campaign to a subscriber would have a different level of need, desire or entitlement to access information regarding that subscriber than another business unit within the enterprise that has had no past dealings and is unlikely to have future dealings with the subscriber.

Enterprises wishing to control access to subscriber information may be enterprises that wish to protect their brand while engaging in distributed messaging, wish to ensure enterprise wide regulatory compliance and/or wish to protect multiple brands of the enterprise. Distributed messaging is often engaged in by a parent corporation with multiple subsidiaries, divisions, departments etc. or by a franchisor with multiple franchisees.

Enterprises engaging in Email campaigns would appreciate a system and method that allows the enterprise to control their brand while enabling a diverse user base access by messaging technologies.

The disclosed system and method permit an enterprise having business units that engage in Email campaigns to subscribers to control access to subscriber information to the business units.

According to one embodiment of a system for controlling access within an enterprise to information associated with recipients of an electronic message campaign of the enterprise sent to a plurality of recipient devices wherein the enterprise includes hierarchically structured Business Units having an enterprise level Business Unit at the highest level and a plurality of second level Business Units and an enterprise system communicatively coupled to a network and including an enterprise level device communicatively coupled to a plurality of second level devices, the system comprises a server and an electronic message engine. The server is communicatively coupled to the enterprise system and the plurality of recipient devices via the network. The server is configured to assign an enterprise account to the enterprise system and generate a user interface presented to the enterprise level device via the network upon validating the enterprise account. The interface is configured to allow a user of the enterprise level device to maintain a recipient list for all recipients of electronic messages from any enterprise Business Unit which recipient list includes information regarding each recipient. The interface is configured to allow the enterprise level device to communicate selected portions of the recipient list to each of the plurality of second level devices and to send electronic messages via the network to the plurality of recipients. The electronic message engine is communicatively coupled via the server and the network to the enterprise system and is configured to generate electronic messages within a message campaign for sending to recipients identified by each of the second level devices from the selected portions of the recipient list communicated by the enterprise level device to each second level device.

According to one embodiment of a method for controlling access within an enterprise to information associated with recipients of an electronic message campaign of the enterprise sent to a plurality of recipient devices wherein the enterprise includes hierarchically structured Business Units having an enterprise level Business Unit at the highest level and a plurality of second level Business Units and an enterprise system communicatively coupled to a network and including an enterprise level device communicatively coupled to a plurality of second level devices. The method comprises the steps of assigning an enterprise account to the enterprise system utilizing a server; validating the enterprise account utilizing the server; generating with the server a user interface presented to the enterprise level device via the network upon validating the enterprise account, the interface being configured to allow a user of the enterprise level device to maintain a recipient list for all recipients of electronic messages from any enterprise Business Unit which recipient list includes information regarding each recipient and configured to allow the enterprise level device to communicate selected portions of the recipient list to each of the plurality of second level devices and to send electronic messages via the network to the plurality of recipients; and generating electronic messages within a message campaign for sending to recipients identified by each of the second level devices from the selected portions of the recipient list communicated by the enterprise level device to each second level device.

One embodiment of the disclosed system and method allows an enterprise to manage subscribers in a more efficient manner especially when the electronic message or email service provider ("ESP") is not the database of record for unsubscribe requests. The disclosed system and method allows enterprises to define and import into opt-out lists.

One embodiment of the disclosed system and method allows sharing of content between different levels of an enterprise organized in a tiered structure.

Additional features and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The present invention is illustrated by way of example and not limitation in the figures of the accompanying drawings in which like references indicate similar elements and in which:

FIG. 4 shows a screen shot of a roles screen of a graphical user interface;

FIG. 7 shows a screen shot of a subscription center page of a graphical user interface;

FIG. 8 shows an _EnterpriseAttribute Table that contains the subscriber attributes for all subscribers in an enterprise;

FIG. 9 shows an example of a BusinessUnitFilterDefinition Table that contains the filter criteria to determine the subscribers that are accessible by a business unit;

FIG. 10 shows a data population script for Object ID Column that has been optimized for large tables;

FIG. 11 shows an example of a data model table that contains the both business unit level unsubscribes and publication list opt-outs;

FIG. 12 shows a column for a business unit table that facilitates managing opt-out requests utilizing publication lists;

FIG. 13 shows a column for a tblLists Table that facilitates managing opt-out requests utilizing publication lists;

FIG. 17 is a screen image generated by a GUI for administering permissions;

DETAILED DESCRIPTION

Figure 1:
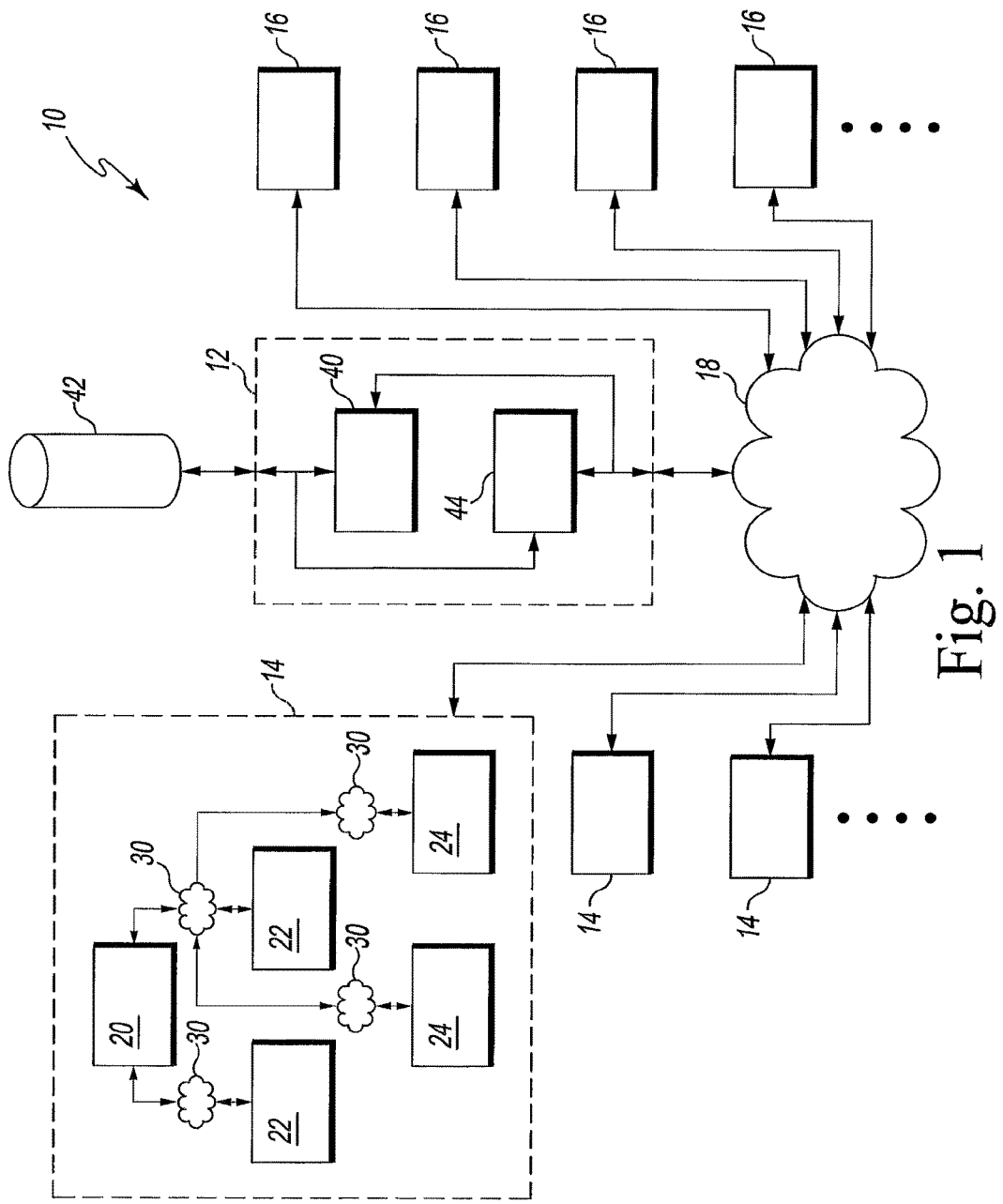
FIG. 1 is a diagrammatic view of a system for controlling access to electronic message campaign subscriber's information within an enterprise.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present invention includes any alterations and modifications to the illustrated embodiments and includes further applications of the principles of the disclosure as would normally occur to one skilled in the art to which this invention pertains.

The disclosed system and method facilitates centralized control and compliance for an enterprise's one-to-one marketing or electronic message or electronic mail campaigns across the enterprises organization. While described hereafter generally with reference to one-to-one marketing and email campaigns, it is envisioned that the described system, method and user interface is applicable to use with all forms of electronic messages (i.e., email, sms, mms, voice, social postings, etc.). The enterprise organization will often include multiple business units typically organized in a tree-like fashion from a top or corporate level of the organization. Other forms of hierarchical and non-hierarchical forms of organization of the enterprise organization are within the scope of the disclosure.

A system for controlling access to an electronic mail campaign subscriber's information within an enterprise 10, as shown, for example in FIG. 1, includes an Email service provider (ESP) system 12, a plurality of enterprise systems 14, a plurality of recipient devices 16 and a network 18. While the term "subscriber" is used herein, it should be understood that such term, unless otherwise specifically indicated should not be viewed as limiting, but includes all types of recipients of electronic messages. Each enterprise system 14 is a computer system or network of computer systems including enterprise level devices 20, second tier devices 22 and third tier devices 24 accessible by differing Business Units 28 of an enterprise 26. The enterprise system 14 may include a network 30, which may be a proprietary local area network (LAN) or wide area network (WAN).

In one embodiment of the disclosed system enterprise level devices 20, second tier devices 22, third tier devices 24 and the plurality of recipient devices 16 are computers, computing devices, or systems of a type well known in the art, such as a mainframe computer, workstation, personal computer, laptop computer, hand-held computer, cellular telephone, or personal digital assistant. Enterprise level devices 20, second tier devices 22, third tier devices 24 and the plurality of recipient devices 16 comprise such software, hardware, and componentry as would occur to one of skill in the art, such as, for example, one or more microprocessors, memory systems, input/output devices, device controllers, and the like. Enterprise level devices 20, second tier devices 22, third tier devices 24 and the plurality of recipient devices 16 also comprise one or more data entry means (not shown in FIG. 9) operable by users of enterprise level devices 20, second tier devices 22, third tier devices 24 and the plurality of recipient devices 16 for data entry, such as, for example, a pointing device (such as a mouse), keyboard, touchscreen, microphone, voice recognition, and/or other data entry means known in the art. Enterprise level devices 20, second tier devices 22, third tier devices 24 and the plurality of recipient devices 16 also comprise a display means which may comprise many of the well known display means such as cathode ray tube displays, liquid crystal diode displays, light emitting diode displays, etc., upon which information may be displayed in a manner perceptible to the user.

Resident on, or accessible by, the plurality of recipient devices 16 operated by the e-mail or electronic message recipient is a software means known in the art for retrieving e-mail or other electronic messages from an e-mail mailbox or a messaging service including, but not limited to software means for viewing e-mail or other electronic messages, for composing a response to an e-mail or other electronic message, and for deleting an e-mail or other electronic message.

In one specific example of the disclosed system, the electronic message or email service provider ("ESP") system 12 includes a server 40, memory 42 and an Email engine 44. In other embodiments, the ESP system 12 may include servers, memory and engines configured for the generation of other formats of electronic messages. The server 40 is communicatively coupled to the network 18 and is configured to generate a user interface for presentation to devices of enterprise systems 14. The Email engine 44 is configured to send Emails for email campaigns on behalf of enterprises to recipients indicated as subscribers of the enterprise and collect information regarding such sent emails. The email engine 44 and server 40 are configured to access memory 42 to store information regarding recipients of emails, email campaigns, enterprises and other relevant information in memory. In one embodiment of the disclosed system and method data stored in memory may be stored in a database.

Server 40 comprises one or more server computers, computing devices, or systems of a type known in the art. Server 40 further comprises such software, hardware, and componentry as would occur to one of skill in the art, such as, for example, microprocessors, memory systems, input/output devices, device controllers, display systems, and the like. Server 40 may comprise one of many well known servers, such as, for example, IBM®'s AS/400® Server, IBM®'s AIX UNIX® Server, or MICROSOFT®'s WINDOWS NT® Server. In FIG. 1, server 40 is shown and referred to herein as a single server. However, server 40 may comprise a plurality of servers or other computing devices or systems interconnected by hardware and software systems know in the art which collectively are operable to perform the functions allocated to server 40 in accordance with the present disclosure.

A database possibly implemented in memory 42 is "associated with" server 40. According to the present disclosure, database is "associated with" server 40 where, as shown in the embodiment in FIG. 1, database resides on memory 42 accessible to server 40. Database is also "associated with" server 40 where database resides on a server or computing device remote from server 40, provided that the remote server or computing device is capable of bi-directional data transfer with server 40. Preferably, the remote server or computing device upon which database resides is electronically connected to server 40 such that the remote server or computing device is capable of continuous bi-directional data transfer with server 40.

For purposes of clarity, database is referred to herein as a single database. It will be appreciated by those of ordinary skill in the art that database may comprise a plurality of databases connected by software systems of a type well known in the art, which collectively are operable to perform the functions delegated to database according to the present disclosure. Database may comprise a relational database architecture or other database architecture of a type known in the database art. Database may comprise one of many well known database management systems, such as, for example, MICROSOFT®'s SQL® Server, MICROSOFT®'s ACCESS®, or IBM®'s DB2® database management systems, or the database management systems available from ORACLE® or SYBASE®. Database retrievably stores information that is communicated to database from enterprise level devices 20, second tier devices 22, third tier devices 24 and the plurality of recipient devices 16 through computer network 18.

Enterprise level devices 20, second tier devices 22 and third tier devices 24 communicate with each other via network 30. Enterprise level devices 20, second tier devices 22, third tier devices 24 and the plurality of recipient devices 16 communicate with server 40 via computer network 18. For purposes of clarity, computer network 30 and computer network 18 are shown in FIG. 1 as distinct computer networks. However, computer networks 18 and 30 may comprise the same computer network. The communication between Enterprise level devices 20, second tier devices 22, third tier devices 24 and the plurality of recipient devices 16 and server 40 may be bi-directional. Computer networks 18 and 30, or both, may comprise the Internet, but this is not required. Other networks, such as Ethernet networks, cable-based networks, and satellite communications networks, well known in the art, and/or any combination of networks are contemplated to be within the scope of the disclosure.

In one embodiment of the disclosed system and method, the user interface presented to the enterprise level device 20 provides robust functionality around permissions, sharing, and subscriber management. Permissions are controls that determine whether a user has access to view, create, update, or delete an item in the system. With the new permissions model, every item, screen, toolbar, and even button can have an associated permission. Because it would be so onerous to set all of the permissions (potentially hundreds of them) for each user in an enterprise system, the concept of roles may be utilized to control certain permissions. Each user is assigned a role (such as "Content Creator" or "Legal Counsel") and that role has a set of permissions associated with it. Roles can also be associated with business units to aggregate the permissions to an even higher level.

FIG. 4 shows a roles screen 400 of a graphical user interface. The specific screen illustrated is for a assigning a user to be a "Content Creator" and includes a tool bar 410, a properties pane 420 and a permissions pane 430. The permissions pane 430 includes an expandable and collapsible list of various types of contents and types of actions that a content creator may be allowed permission to perform or denied permission to perform.

Many enterprises engage in email marketing utilizing Email programs that often include more than one Email campaign. For instance, enterprises may deliver a monthly Email newsletter (eNewsletter) to subscribers and/or send a plurality of real-time transactional messages (marketing Emails) each of which relates to a different offer or transaction. Enterprises often utilize an Email service provider (ESP), a company providing Email services, to carry out their Email marketing campaigns. ESPs offer email marketing or bulk email services. Neither of these terms should be confused with "spam" or the sending of unwanted or unsolicited bulk email of a marketing or otherwise offensive nature. Email spam, also known as junk Email, is a subset of spam that involves nearly identical messages sent to numerous recipients by Email. Common synonyms for Email spam are unsolicited bulk Email (UBE) or unsolicited commercial Email (UCE). Definitions of spam usually include the aspects that Email is unsolicited and sent in bulk.

An ESP typically provides a wealth of tracking information showing the status of email sent to each member of an enterprise's address or recipient list. ESPs typically store this tracking information in memory utilizing a database that associates each subscriber with each Email campaign of each entity to which it relates. Each Email campaign includes a subscriber or address list of recipients of the Emails sent to carry out the Email campaign. ESPs also provide the ability to segment an address list into interest groups or categories, allowing the user to send targeted information to people who value the e-correspondence.

ESPs often offer many services that permit an enterprise to conduct effective Email marketing campaigns. Some ESPs such as, for example, ExactTarget, LLC, provide toolsets to enterprises that include: content creation tools; personalization, segmentation, and viral marketing tools; underlying technology and deliverability tools; tools facilitating data transfer between the ESP's system and database and other business systems of the enterprise; tracking and graphical reporting tools and management tools allowing account administrator control, customization, and configuration.

A List is a collection of people that share a common set of attributes. Lists can be created by direct population from import files. Lists can be tied to acquisition mechanism such as sign up web pages, mobile originated text messages, or social forwarding. Lists can be tied to triggered sends to capture data about the people sent to. Lists can be tied to external systems synchronized by an integration platform. Lists can be created by applying a rule set to an existing list. Lists can inherit from other lists in the sense that they expose the attributes of the other list as their own. Lists are the target for send activities. Lists are the containers for storing data captured from outside the system.

In one embodiment of the disclosed system, method and user interface there are many types of lists, such as, for example, publication list, suppression lists, opt-out lists and "do not send" lists. Publication lists express preferences as to whether a person wants to receives a message type, how often they want to receive it, and how they want to receive it. Publication Lists are the means of managing these preferences when an ESP is the database of record for subscription preferences. When an ESP is not the database of record for subscription preferences, Suppression and Opt-Out lists can be used to provide a means of capturing subscriber opt-outs (via SPAM complaints, for example). Suppression Lists are lists of people who have expressed a preference to not receive a specific message. Opt-Out Lists are lists of addresses that are tied to a preference to not receive a specific message. Suppression and Opt-Out Lists can be linked to sending contexts so that they suppression is automatic. Opt Outs captured by the ESP (when it is not the database of record for subscriptions) will add records to the Suppression and Opt-Out Lists tied to the sending context. This data can be passed to the enterprise customer to allow them to update their subscription database. In addition, Suppression and Opt Out lists can be used to manage "do not send" lists maintained by Enterprises (these lists may include people who have sent letters asking to be removed, people who work for competitors, or people who have complained in the past).

An attribute is a property of a person represented with the system. Attributes have rich metadata around them including type, length, validation rules, and selection lists. Attributes can also be dimensional in that they represent a hierarchical value. An example of a dimensional attribute would be Region when Regions roll up into territories and territories roll up into districts. Attributes can be dynamic. Their value is calculated at run time. Attributes can be defined at the Enterprise level. These attributes will apply to all persons contained within the Enterprise other than ad hoc lists tied to specific data sources (e.g., an import from a file to support a one-time send). Business Units can also define attributes that enhance those of the Enterprise. Enterprises desire the flexibility to allow people imported into a Business Unit to be imported into the Enterprise at the same time. In addition, users want to be able to provide some level of isolation between Enterprise attribute values and Business Unit attribute values. This isolation could be simple hiding of Enterprise attributes at the Business Unit level or the ability to override Enterprise attribute values at the Business Unit layer. The disclosed system, method and user interface combines Enterprise and Business Unit attributes within the context of a Business Unit so that they seem like a single set of attributes belonging to the Business Unit.

The disclosed system and method allows enterprises engaging in an e-mail campaign to control their brand while enabling a diverse user base access to messaging technologies. The disclosed system and method introduces a new structure for Business Units, access and sharing, roles and permissions, and subscriber management under one account.

Business Units manage the visibility of data within an account, are hierarchical, and do not have to mirror the actual organizational structure of the enterprise engaging in the e-mail campaign. Business Units (as opposed to "business units") can mirror a workflow, such as approvals. Utilizing Business Units, an enterprise can inherently manage access and sharing of information through the hierarchical, parent/child structure as well as controlling it through roles and permissions. Business Units have roles assigned to them such that all users working in that Business Unit share a common set of permissions.

Business Units introduce a hierarchical administration structure in the disclosed system and method. Business Units present an approach for controlling data for purposes such as branding and regulatory compliance for direct email marketing and other electronic messaging campaigns. A Business Unit is a hierarchical administration structure that controls access to information and sharing of information. A Business Unit allows for the management of user roles for the business unit, viewing of users who have access to the Business Unit, and defining filter criteria for subscribers. All items created in a Business Unit are accessible to all users working in that Business Unit. Items can be shared with other users in other Business Units, which in one specific example of the disclosed system and method is accomplished by placing them into a shared items folder located in the Content and Subscribers sections of the applications.

Business Units manage the visibility of data within an account using a hierarchical structure, which can be organized in any way to match an organization's business needs. Business Units can, for example, mirror workflow processes, demographic and behavioral data about subscribers, or the organization's operational structure. In one specific embodiment, a landing page can be used to create a customized home page for child Business Units to see when they log in to the application.

Figure 14:
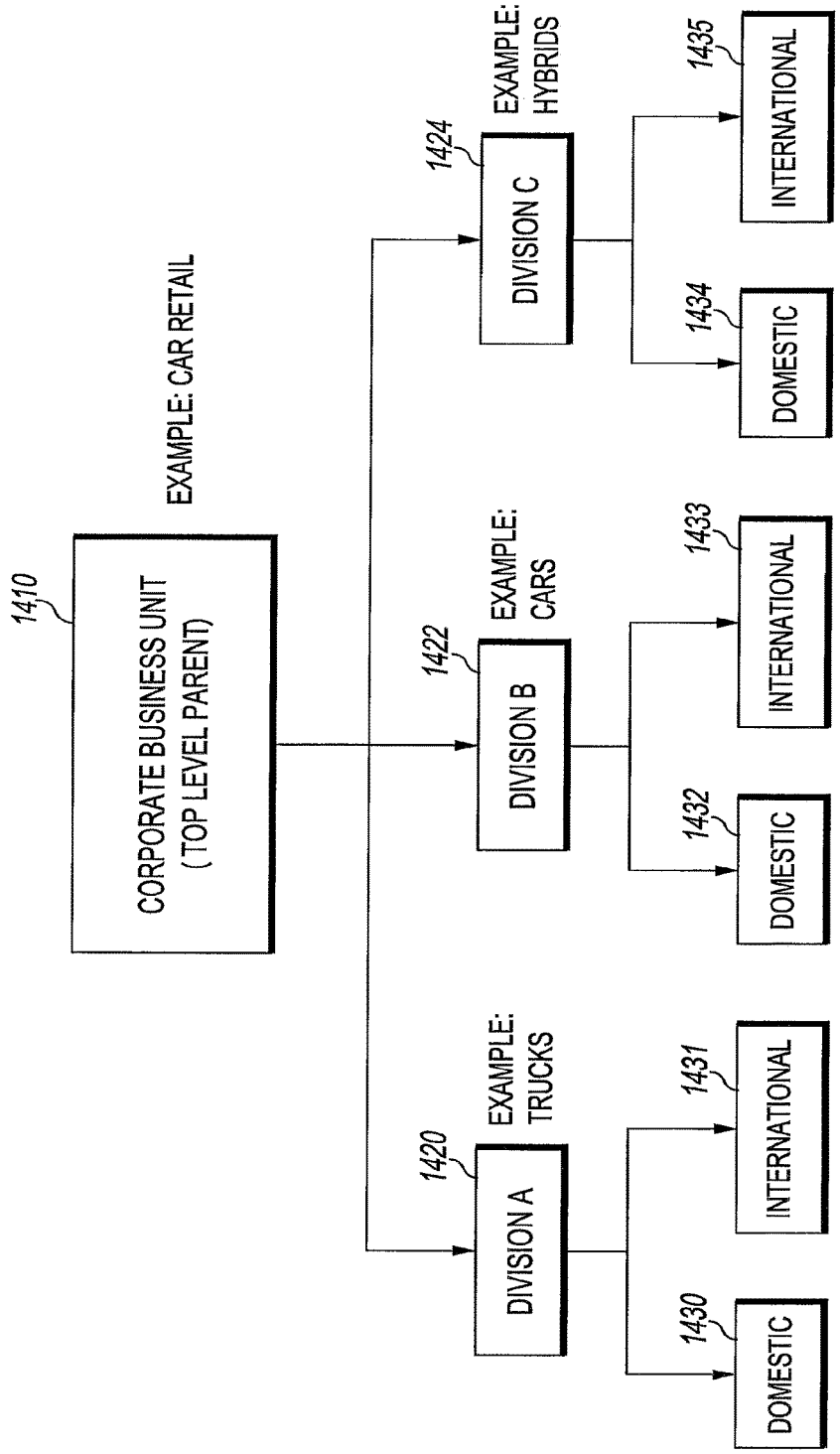
FIGS. 14-16 are diagrams of the utilization of the concepts of Business Units as a way of controlling access to subscriber information and other shared items of marketing campaigns of an enterprise.

In one specific application, Business Units are implemented in a hierarchical, parent/child structure, as shown, for example, in FIG. 14 which represents an example of a Business Unit Structure with three levels reflecting an organizations operational structure. In the illustrated example, the top level is a corporate Business Unit which may for example be a Car retailer. The top level Business Unit may, for example, maintain control over branding by dictating templates and styles to be utilized for communications for all divisions of the organization. This car retailer may sell trucks, cars and hybrids domestically and internationally. In the illustrated example, the second level of the Business Unit structure includes three Business Units identified as Division A (related to truck sales), Division B (related to car sales) and Division C (related to hybrid sales. The second level Business Units may maintain control over content and the types of correspondence to be sent to recipients or subscribers. The third level Business Units represent the domestic and international regional subdivisions for each division in the second level. The third Level Business Units may maintain control over subscription lists and personalization of electronic messages.

The disclosed system method and user interface allows an organization to control its brand while enabling access to messaging technologies. The hierarchical structure may be utilized to control visibility of information to the organization's users.

In one specific embodiment of the disclosed system method and user interface, a Business Unit is created by accessing an application the presents a graphical user interface ("GUI"). The GUI displays a screen with and Admin tab or icon, which when clicked presents several options for an authorized user to select from. Among these options will be a Business Units tab or icon. Upon selecting the Business Units icon, in one embodiment a menu is present which includes a Create menu item. The authorized user then selects the Create menu item and the GUI displays a New Business Unit workspace which includes Properties, Physical Address, and Unsubscribe Settings sections for completion as necessary and appropriate for the Business Unit to be created. The authorized user may then click the Save button to save the new Business Unit and return to the Business Units workspace.

In the same specific example of the disclosed system, method and user interface, a Business Unit is deleted by an authorized user clicking on Admin, Business Units in the browser. Checking a checkbox in front of the business unit to be deleted and clicking the Delete menu item. This results in the selected Business Unit being permanently deleted from the list of Business Units. In the same specific example of the system method and user interface, roles for a Business Unit may be managed by and authorized user clicking Admin and Business Units in the browser. Then checking the checkbox in front of the Business Unit for which the role is to be managed. Then clicking a Manage Roles menu item to open a Roles workspace. The authorized user then checks the checkbox in front of the role(s) desired to be assigned to the Business Unit selected. Clicking the Save button saves the new roll settings for the Business Unit and returns the GUI to the Business Units workspace.

In the same specific example of the disclosed system, method and user interface, an authorized user may view users associated with a Business Unit by clicking Admin and then Business Units in the browser. The authorized user then checks the checkbox in front of the Business Unit for which the authorized user wishers to view users and clicks the View Users menu item to open the View Users workspace. The GUI displays a screen containing a list of users associated with the selected Business Unit. Clicking on Business Units in the Admin browser window return the GUI to the Business Units workspace.

In the same specific example of the disclosed system, method and user interface, an authorized user may Define a Subscriber Filter to Select Subscribers Visible to a selected Business Unit by clicking Admin and then Business Units in the browser. The authorized user then checks the checkbox in front of the Business Unit for which a subscriber data filter is to be defined and clicks the Define Subscriber Filter menu item to open the Subscriber Filter workspace. Data filters are described in grater detail later in this application.

In one embodiment of a disclosed system and method, a user interface presents a display including a shared items folder. Sharing is an explicit action taken by the owner of the item to allow other Business Units to access an item. Given that a user has the appropriate permissions, any user may share their data to other Business Units. A shared item can be an email or other electronic message, template, portfolio, or content area. All shared items have an option for an appropriately authorized user to set permissions. These permissions control who has access to the shared item and in what capacity. For example, a user may be able to view a shared item but not make changes to it, or may be able to make changes to a shared item but not delete it. The difference between a shared item and a non-shared item, such as an email, is that the shared item allows an appropriately authorized user to set permissions for particular roles that should be permitted to access that item. For example, if a template is to be used by all of an enterprise's Business Units, an appropriately authorized user creates the template as a shared item and sets permissions for the item to allow access by all users in all Business Units. When an item is shared, access is granted to an instance of the item. Anyone with access to the item can view and access changes made to the item. In one embodiment of a disclosed system and method, shared items are located in a shared items folder, which is a tool in an account used to share information between Business Units and users. Items that are saved into one of these folders are available to all users working in that Business Unit.

In one embodiment of the disclosed system, method and user interface, any user can share items if they have the correct permission set in their role. In this embodiment, sharing is an explicit action taken by the owner of the item to allow others to access an item. Any user working in a Business Unit with shared items can access the shared items. It is within the scope of the disclosure for permission to share items to be otherwise limited, such as, for example, requiring the user had to be in an admin account to share items and requiring items to be copied into a shared folder.

A shared item can be an email or other electronic message, a template, a portfolio, or a content area. In one embodiment of the disclosed system, method and user interface, the GUI presents a screen for all shared items providing an option for an appropriately authorized user to set permissions. These permissions control who has access to the shared item and in what capacity. For example, a user may be able to view a shared item but not make changes to it, or may be able to make changes to a shared item but not delete it. The difference between a shared item and a non-shared item, such as an email template, is that users outside the Business Unit can access the shared item if they have particular role and permission settings. In one embodiment, permissions can be set for particular roles to allow access to particular items for users outside the Business Unit. For example, if it is desirable for a template to be used by all of an enterprise's Business Units, then the template can be created as a shared item with permissions set for the item to allow access by all users in all Business Units. When an item is shared, in one embodiment, access is granted to an instance of the item. Anyone with access to the item can view and access changes made to the item.

In one embodiment of the disclosed system, method and user interface, shared items are located in a shared items folder, which is a tool in an enterprise-edition account used to share information between Business Units and users. Items saved into a shared folder are available to all users working in that Business Unit.

Shared items may be utilized to share branding, content, and images for emails and other electronic messages, landing pages and websites. Sharing items makes it easier to control your data and messaging across diverse scenarios.

In one embodiment of the disclosed system, method and user interface, shared items are viewed by opening a Shared Items folder in a Content tab on a screen presented by a GUI and then clicking on the shared folders to see a list of shared items in the workspace. A screen will be presented by the GUI displaying items for which the user has access. In this specific embodiment, a shared email item would be created by opening a shared item folder, clicking the shared emails folder and then clicking the Create menu item on screen present by a GUI. Within the Create menu the user may select among different methods of creating new email, which may include, for example, from the following: building from an existing template; building from HTML; or revising an existing email. After selecting the desired method of creating the email the user may then click the Next button on the screen and the GUI generates one or more additional screens for entry of information in subsequent dialogs to create the email. Upon creation, the shared email item is appended to the list of shared email items. The user may then click the Permissions menu item to set permissions for the shared item as described elsewhere herein.

In one embodiment of the disclosed system, method and user interface, shared templates are created in a shared item folder by clicking on the shared templates folder and then clicking the Create menu item. On the screen generated by the GUI, the user then enters a name for the template and designates a folder to store the template. The user then selects a method for creating the new template. The method for creating the new template may include using template editor or pasting an HTML. Once the method for creating the template is selected, the user clicks the Submit button and is presented by the GUI with appropriately configured screens for entry of information into dialogs to create the template. A shared template item is appended to the list of shared template items upon creation. After selecting the template item, the user clicks on the Permissions menu item to set permissions for the shared item as described elsewhere herein.

In one embodiment of the disclosed system, method and user interface, shared portfolios are created in a shared item folder by clicking on the shared portfolio folder and then on the screen generated by the GUI clicking the Single Upload or Batch Upload menu item. The user may then select file(s) to upload and click the OK button to upload the file(s) or the Cancel button to not upload the files and return to the shared portfolio workspace. The uploaded files are included in a shared portfolio item which is appended to the list of shared portfolio items. After selecting the appropriate shared portfolio item, the user clicks on the Permissions menu item to set permissions for the shared item as described elsewhere herein.

In one embodiment of the disclosed system, method and user interface, shared content is created in a shared item folder by clicking on the shared content folder and then clicking the Create Content menu item on the screen generated by the GUI. A name for the content is entered and a folder is designated to store the content. The user then clicks the Next button to advance to the next dialog or clicks the Cancel button to not advance to the next dialog and return to the shared content workspace. In the next dialog, the content orientation may be selected from the following: Text Only; Image Only; Image top; Image Bottom; Image Left; Image Right; Free Form; and, HTML Only. Once selected the user clicks on the Next button to advance to the next dialog where the user defines the initial properties of the content area and then clicks the Next button to advance to the next dialog. In the next dialog, the user formats and enters the content to be shared, as necessary. After entering the content to be shared, the user clicks the Save button to save the content and return to the shared content workspace, or clicks the Cancel button to not save the content and return to the shared content workspace. The created shared content item is appended to the list of shared content items. After selecting the appropriate shared content item, the user clicks on the Permissions menu item to set permissions for the shared item as described elsewhere herein.

In one embodiment of the disclosed system, method and user interface, shared items can be updated by opening the shared item, making changes as necessary and saving the item, changing the permissions as necessary and saving the changes. Shared items can also be deleted, by opening the shared item and clicking the Delete menu button to permanently delete the shared item. To update or delete a shared item, the user attempting the update or deletion must have appropriate permission to accomplish the task. The GUI generates appropriate screen to carry out these tasks.

In one embodiment of the disclosed system, method and user interface, permissions can be changed for a shared item only by the owner of the item. Even if the owner is in a Business Unit for which permissions have been removed, as an owner, that user can still perform all operations on the item. Permissions on a shared item can be changed by the owner, selecting the Content tab, clicking Shared Items and clicking the folder of the items to share on a GUI. The GUI then generates a screen including a checkbox next to each item to share. Upon selecting the check box for the shared item upon which permissions are to be changed, the owner of the shared item clicks Permissions and selects the checkbox next to the Business Unit for which the owner desires to edit the permissions. The owner then clicks Edit Permissions and is presented with a screen where permissions for the selected Business Unit may be checked or unchecked. The owner then clicks the Save button to save the settings and returns to the edit permissions workspace or clicks the Cancel button to not save the settings and return to the edit permissions workspace. Upon clicking the Return menu item the screen presented to the owner by the GUI returns to the shared items workspace.

In one embodiment of the disclosed system, method and user interface, publication lists may be shared from parent Business Units to child Business Units, Therefore, the master publication list that controls opted-out subscribers can be used to compare to subscriber lists, which ensures that only the subscribers who opted-in for the publication receives the publication. A shared publication list has a direct impact on the subscription center of the Business Units with which the publication list has been shared. When a subscriber visits the subscription center through an email sent from a Business Unit, the subscriber sees a list of publications which includes both the publication lists created by the Business Unit and the publication lists shared with the Business Unit.

In one embodiment of a disclosed system and method, a role is a collection of permissions that allow or deny actions on an item or item property. If a permission is not set, the permission has the same effect as a denial of permission. For example, a user has a collection of permissions for an email item that allow him/her to create, view, and update an email but denies permission to delete an email. This same user may have permissions for an image item that allow the user to upload and view an image but denies permission to update or delete an image. In one embodiment of a disclosed system and method, roles are assigned to users and Business Units. Roles assigned to a Business Unit apply to all users in that Business Unit. Therefore, a single user can have multiple roles. In one embodiment of a disclosed system and method, an application aggregates permissions from all roles for each user.

Roles and permissions are tools which are used in one embodiment of the disclosed system method and user interface. A role is a collection of permissions that allow or deny actions on an item or item property. If a permission is not set, the permission has the same effect as a deny. For example, a user has a collection of permissions for an email item that allow him/her to create, view, and update an email and denies permission to delete an email. This same user may have permissions for an image item that allow him/her to upload and view an image and denies permission to update or delete an image.

An image generated by a GUI for administering permission is shown, for example, in FIG. 17. Referring to FIG. 17, the selected user has access to the actions that have check marks in the allow column. The user can create, view, and update an email but cannot delete one. Notice that many of the check boxes are not set. Therefore, this user does not have permission to perform those actions.

In one embodiment of the disclosed system, method and user interface, roles are assigned to users and Business Units. Roles assigned to a Business Unit apply to all users in that Business Unit. Therefore, a single user can have multiple roles. One embodiment of the disclosed system, method and user interface aggregates permissions from all roles for each user. Users inherit roles from their Business Units. In one embodiment, Child Business Units inherit roles and permissions from their parent when a Force Inheritance checkbox is selected when managing Business Unit roles. Other ways of forcing inheritance are within the scope of the disclosure.

It is within the scope of the disclosure for different types of roles to have different characteristics. For example, in one embodiment of the disclosed system, method and user interface there are user roles, business roles and individual roles. The characteristics of user roles are that the permissions stay with the user regardless of Business Unit in which they are working. The characteristics of Business Unit roles are that any user working in a Business Unit acquires the role and permissions of the Business Unit. The characteristics of individual roles are that they override all other roles assigned to the user or inherited by the user. The system uses the permissions aggregated from all of a user's roles according to the following logic to determine whether the user can access an item: if no permission of the assigned role has explicitly granted access to an action, the action is denied; if one of the permissions of the assigned role has explicitly denied access to an action, the action is denied; and otherwise, the action is granted.

The use of roles and permissions facilitates management and control of access to actions that can be taken against data in the application. In one embodiment of the disclosed system method and user interface, an authorized user can create and name rolls as they see fit. For example, an authorized user might create a "Content Creator" role for a user to create emails but not send them. Alternatively or additionally, the authorized user might create a "Content Reviewer" role for a user to only read content. Other typical roles that might be created are "Administrator" or "Analysis" roles. Thus, it should be apparent to those skilled in the art that roles may be used to enforce security policies of the enterprise or organization.

The following description indicates how roles and permissions may be managed in one embodiment of the disclosed system, method and user interface. Roles may be created and permissions assigned by clicking on the Admin tab on a screen presented by a GUI and then clicking Account Settings and Roles on subsequent screen to open the Roles workspace. Within this workspace the authorized user clicks on Create from the toolbar and then completes the Properties section by providing the name of the role in a Name text area, a unique identifier for utilization in a database in the External Key text area and a textual description for the role in the Description text area. The authorized user then completes the Permissions section by clicking allow or deny as applicable for each permission. If a permission is not selected, the permission is considered the same as a deny. When an item in the allow column is checked which item has related item associated therewith, one embodiment of the system, method and user interface treat checking of the one item as checking all the permissions in the allow column related to the item. This is also true for the deny column. If some but not all of the permissions to an item are desired to be granted, then each individual desired permission for the item should be checked.

A role may be deleted by an authorized user clicking the Admin tab, clicking the Account Settings and clicking Roles on screens generated by the GUI to open the Roles workspace. The authorized user may then check the checkbox in front of the role to be deleted and then click the Delete menu item. The role is deleted. Permissions for a user and a Business Unit are recalculated when a role is deleted.

A role may be updated by an authorized user clicking the Admin tab, clicking the Account Settings and clicking Roles on screens generated by the GUI to open the Roles workspace. The authorized user may then click the role name that is to be updated to open the Role properties and permissions workspace. The authorized user may then make changes as necessary and when finished making changes click the Save button to return to the Roles workspace.

A role may be assigned to a user by an authorized user clicking the Admin tab, clicking My Users and then checking the checkbox in front of the name of the user for which a role is to be assigned and then clicking the Manage Roles menu item to open the user workspace. In the user workspace the authorized user may select a Business Unit from the drop down box that contains the role to be assigned and then click the Edit Roles link. Optionally, the authorized user may check/uncheck the checkbox in front of the role(s) to be assigned/unassigned or check/uncheck the checkbox in front of the permission(s) to be assigned/unassigned. After assigning or unassigning roles to the selected user, the authorized user clicks the Save button to save the settings and return to the My Users workspace. Clicking the Cancel button returns the authorized user to My Users workspace without saving the new settings.

A role may be assigned to a Business Unit by an authorized user clicking the Admin tab, clicking Account settings, clicking Business Units and checking the checkbox in front of the Business Unit for which a role is to be assigned. On the screen presented by the GUI the authorized user then clicks Manage Roles and checks/unchecks the checkbox in front of the role(s) to be assigned/unassigned. Clicking the Save button saves the settings and returns the screen presented by the GUI to the Business Units workspace. Clicking the Cancel button returns the screen presented by the GUI to the Business Units workspace without saving the changes.

In one embodiment of the disclosed system, method and user interface, shared items are viewed by opening a Shared Items folder in a Content tab on a screen presented by a GUI and then clicking on the shared folders to see a list of shared items in the workspace. A screen will be presented by the GUI displaying items for which the user has access. A shared item may be created by clicking a folder for the type of shared item to be created which may include Emails, Templates, Portfolio Items or Content. In this specific example, a shared item would be created by opening a shared item folder, clicking the shared item type folder and then clicking the Create menu item on screen present by a GUI. The authorized user then follows the instructions in the dialog box that opens. Clicking the Save button saves the settings and returns the screen generated by the GUI to the shared items workspace. The authorized user then clicks on the Permissions menu item and applies a role and sets permissions for the shared item. Clicking the Save button saves the settings and returns the screen presented by the GUI to the shared items workspace.

In one embodiment of the disclosed system, method and user interface, an owner of an item can change permissions for a shared item by selecting the Content tab, clicking Shared Items, clicking the folder of the items to share and selecting the checkbox next to the item to share. The owner then clicks Permissions and selects the checkbox next to the Business Unit for which the permissions are to be edited. The owner then clicks Edit Permissions and checks/unchecks permissions for the Business Unit as desired. Clicking the Save button saves the settings and returns the screen generated by the GUI to the edit permissions workspace. Clicking the Cancel button returns the screen presented by the GUI to the edit permissions workspace without saving changes. Clicking the Return menu item from within the edit permissions workspace returns the screen presented by the GUI to the shared items workspace.

In one embodiment of the disclosed system, method and user interface, subscriber filters may be defined by an authorized user by clicking the Admin tab, clicking Business Units and Checking the checkbox next to the Business Unit for which a filter is to be created. The authorized user then, clicks the Define Subscriber Filter menu item and completes the filter criteria. The results of this filter will become the all-subscribers list for the Business Unit. Unsubscribe options can be controlled on the Business Unit detail to control behavior of the entire unsubscribe options, and not the individual opt-out lists. Clicking the Save button saves the settings and returns the screen presented by the GUI to the Business Units workspace. Click the Cancel button the Cancel button returns the screen presented by the GUI to the Business Units workspace without saving changes.

In one embodiment of a disclosed system and method, subscribers are managed at each level of the hierarchy, which ensures the correct list of subscribers receive the marketing campaign. For example, at the parent level, the marketing campaign subscriber list, which is composed at a child level of the hierarchy, can be compared to a master unsubscribe list to ensure unsubscribes are removed from the specific marketing campaign subscriber list.

Figure 15:
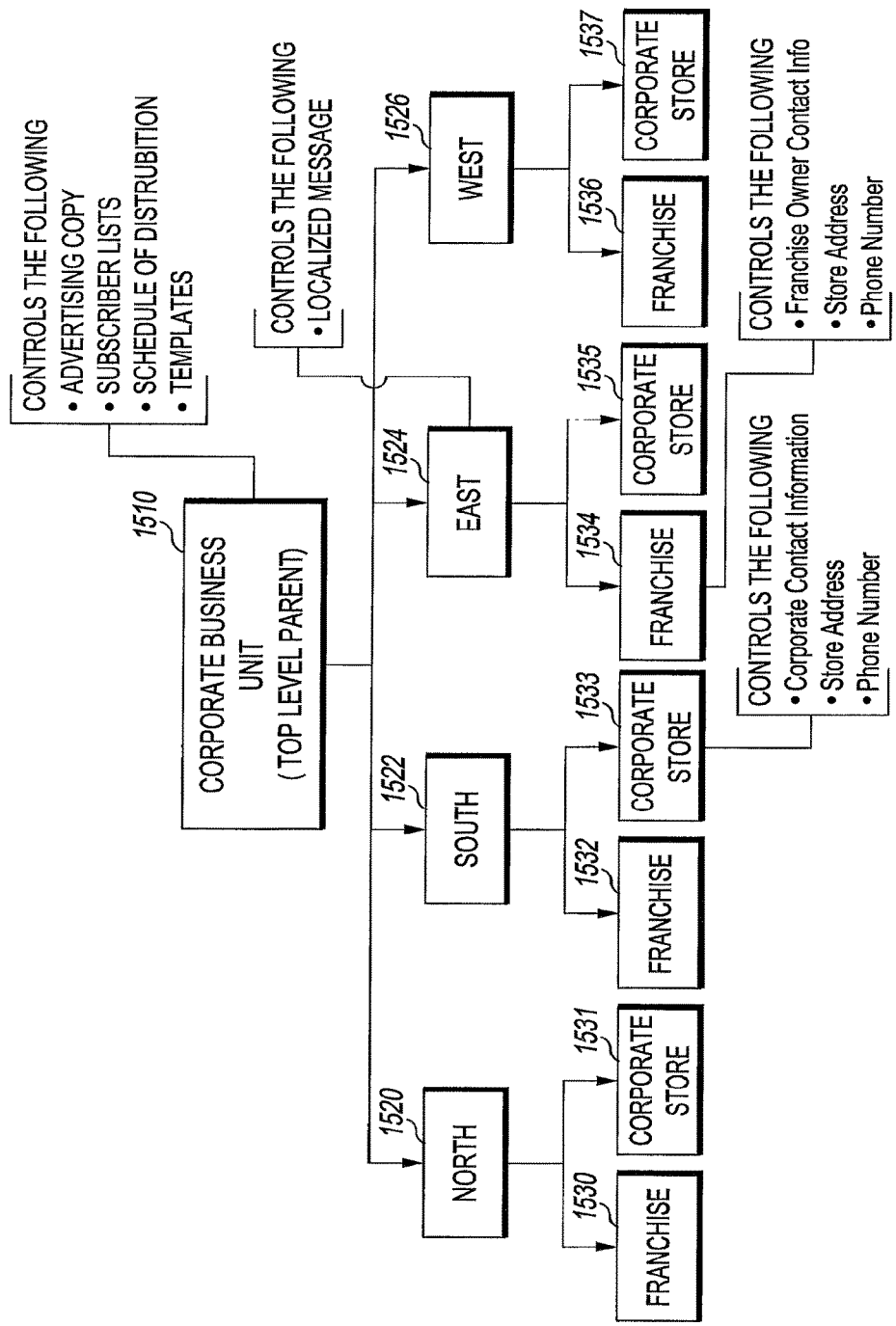

In one embodiment of a disclosed system and method, Business Units can have different hierarchical structures than the actual hierarchical structure of the physical business units of an entity in order to facilitate different results. For instance, Business Units can be utilized to facilitate distributed messaging. For example, the top parent business unit controls creative digital assets, subscribers, and the calendar for communication (sending schedule). As shown, for example, in FIG. 15, a typical corporate structure that would use distributed messaging is a corporate enterprise with franchise and corporate owned stores. The top level 1510 owns the advertising copy and subscriber lists and sets the schedule for sending marketing campaigns to its customers. It creates the template for the marketing campaign. The second level, which are regional owners (North Business Unit 1520, South Business Unit 1522, East business Unit 1524 and West Business Unit 1526) of franchises as well as corporately owned stores, add a localized message to the marketing campaign. The individual stores (Business Units 1530-1537) add contact information, such as store address and phone number.

FIG. 14 shows, for example, the utilization of Business Units for multi-branded organizations. For example, the top parent Business Unit 1410 is the corporate brand. The second level Business Unit represents individual brands owned by the corporation. The top parent Business Unit 1410 creates a template with the corporate brand. The secondary Business Units 1420, 1422, 1424 add their branding. The third level Business Unit 1430-1435 may be a division or a region for the brand. This level would add the content for the communication and would manage the subscriber lists.

Figure 16:
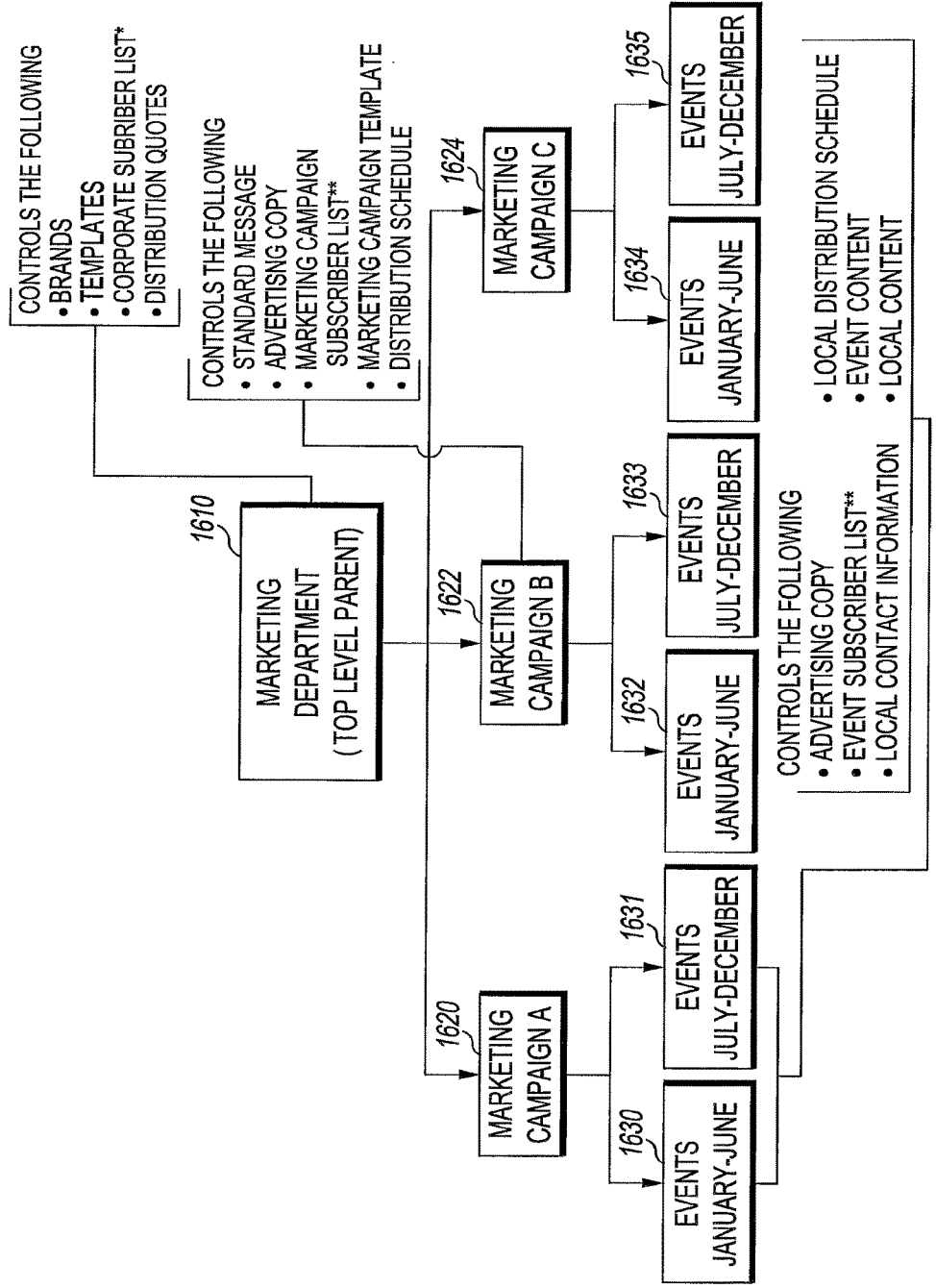

FIG. 16 shows, for example, the utilization of Business Units for marketing campaigns. For example, the top parent Business Unit 1610 is the marketing department of an enterprise. The second level Business Unit represents individual marketing campaigns, for example, campaign A 1620, campaign B 1622 and campaign C 1624. The third level Business Units 1630-1635 represents events, such as conferences. This is a hybrid structure and subscribers need to be managed at each level and opt-in for each event. Subscribers also need to be managed at the top parent Business Unit CC10 level to ensure that subscribers choices are honored, which can be accomplished through publication lists as described below.

To facilitate implementing an Email campaign, the enterprise will typically provide the ESP with an address or subscriber list of persons or entities that should be presented with Emails contained in the Email campaigns. This subscriber list may be in the form of a database including names, Email addresses and other demographic or business related information regarding each potential recipient.

In one embodiment of the disclosed system, method and user interface, a subscriber is a person who has opted to receive communications from an organization. At a minimum, the organization must have a valid email address for each subscriber to email messages, and a telephone number for each subscriber to SMS and voice messages. Additional information about subscribers can be tracked utilizing profile attributes and preference attributes. A subscriber key can be used to identify subscribers. Email subscriber information can be stored in lists or data extensions. SMS and voice subscriber information can be stored in data extensions. As many lists and data extensions can be created as needed to segment subscribers. Subscribers can be added manually (individually) or by importing a collection of subscribers. Groups and data filters can be utilized to segment subscribers. When a message is to be sent, a list, data extension, and/or groups to receive the message is selected.

In one embodiment of the disclosed system, method and user interface, all subscribers in an enterprise account, regardless of which Business Unit imports them, are stored in the parent account. Access to the subscribers for child accounts is governed by a filter that the administrator defines for each Business Unit. The filter selects subscribers for a Business Unit based on values in the subscriber attributes. For example, if an enterprise has Business Units that served the north, and south regions, the filters could be created for each selected subscriber based on the value in a Region attribute. In the enterprise account, subscriber attributes can only be created in the parent account. Each region can be further divided by departments, which allows for the creation of a filter for each of the departments, as illustrated, for example, in FIG. 18.

Figure 18:
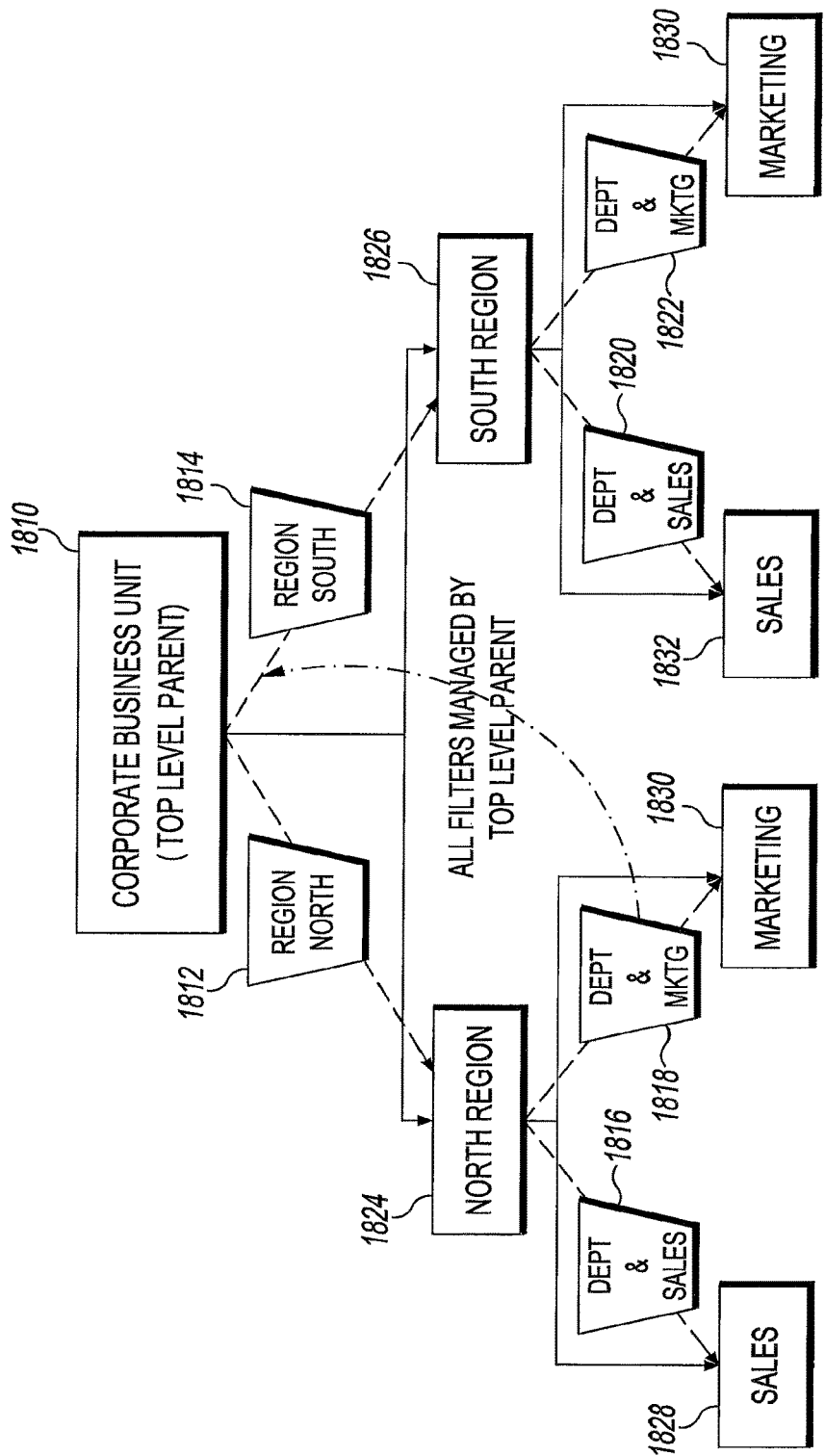
FIG. 18 is a diagrammatic view illustrating how a parent, enterprise level or corporate level Business Unit can manage an all subscribers list utilizing subscription filters to provide appropriate portions of the data in the all subscribers list to child or regional Business Units and grandchildren or departmental Business Units.

FIG. 18 illustrates how a parent, enterprise level or corporate level Business Unit 1810 can manage an all subscribers list utilizing subscription filters 1812, 1814, 1816, 1818, 1820, 1822 to provide appropriate portions of the data in the all subscribers list to child or regional Business Units 1824, 1826 and grandchildren or departmental Business Units 1828, 1830, 1832, 1834. In the diagram, the solid arrow extending between Business Units 1810, 1824, 1826, 1828, 1830, 1832, 1834 illustrate the hierarchical structure of the corporate structure of the organization, the shorter dashed lines represent the filtered flow of the all subscribers list from the corporate Business Unit through filters 1812, 1814 to the regional Business Units 1824, 1826 and further filtered flow of the all subscribers list through filters 1816, 1818, 1820, 1822 to the departmental Business Units 1828, 1830, 1832, 1834. The longer dashed arrow represents the flow of a filtered regional subscriber list from the North Regional Business Unit 1824 through filter 1818 to the corporate Business Unit 1810. In the illustrated embodiment, the subscription filters 1812, 1814, 1816, 1818, 1820, 1822, separate the subscribers list based on subscriber attributes at the regional and departmental level. The corporate Business Unit 1810 manages the all subscribers list and creates and manages all of the filters 1812, 1814, 1816, 1818, 1820, 1822. The regional Business Units 1824, 1826 produce templates for sales and marketing campaigns for use by the departmental Business Units 1828, 1830, 1832, 1834 and sends their filtered all subscriber lists through additional filters 1816, 1818, 1820, 1822 to the departmental Business Units 1828, 1830, 1832, 1834. In the embodiment illustrated in FIG. 18, the regional filters 1812 and 1814 filter the all subscriber list based on regional attributes, while the departmental filters 1816, 1818, 1820, 1822 further filter the filtered list received by each regional Business Unit 1824, 1826 based on a departmental attribute, illustratively sales vs. marketing.

Figure 19:
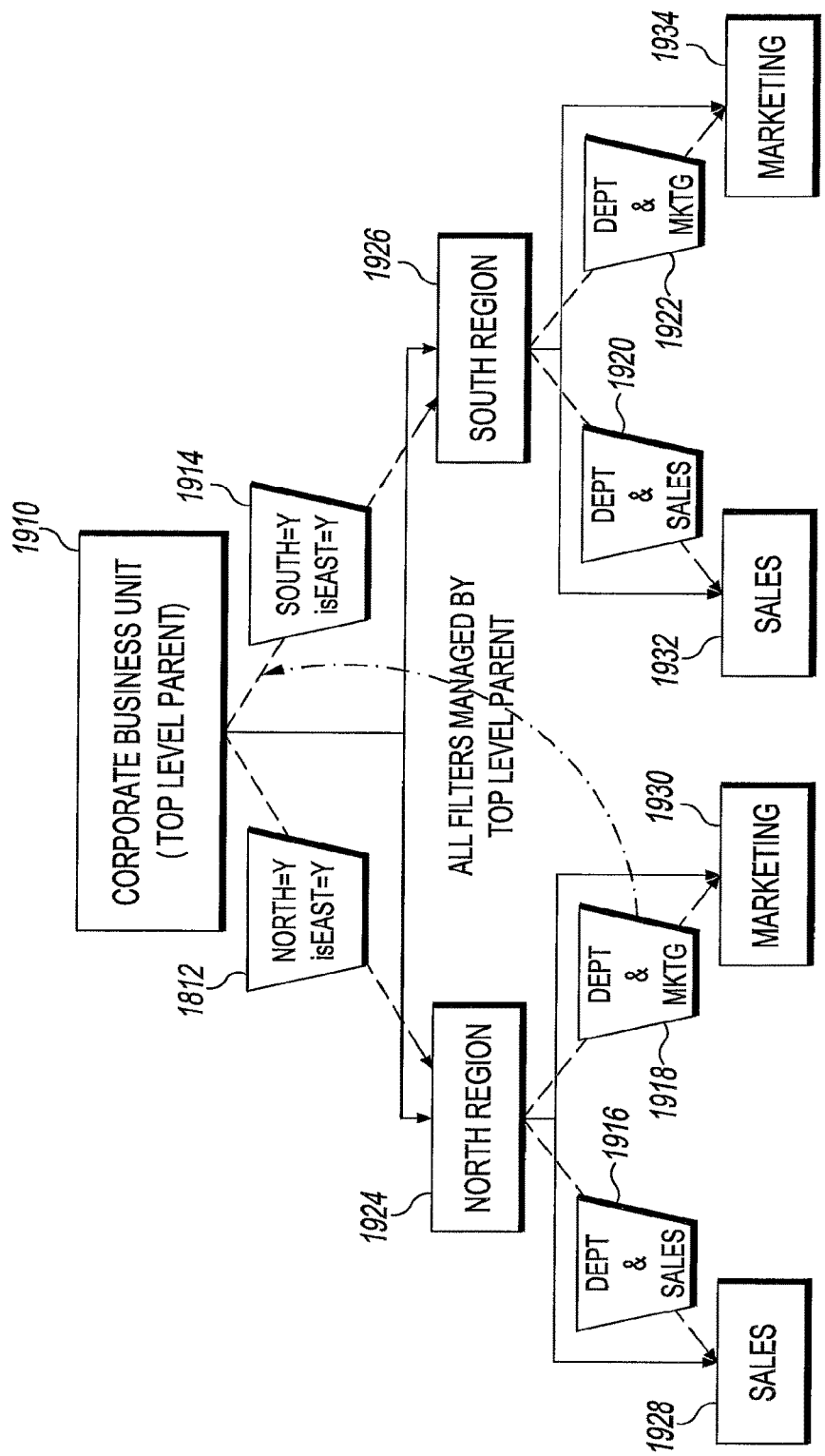
FIG. 19 is a diagrammatic view illustrating how a parent, enterprise level or corporate level Business Unit can manage an all subscribers list utilizing subscription filters to provide appropriate portions of the data in the all subscribers list to child or regional Business Units and grandchildren or departmental Business Units wherein a single subscriber can satisfy multiple filters.

Subscriber filters that use multiple subscriber fields can be created. For example, a yes/no field for each of the Business Units can be created. A single subscriber can satisfy multiple filters, as illustrated, for example, in FIG. 19. In the diagram, the solid arrow extending between Business Units 1910, 1924, 1926, 1928, 1930, 1932, 1934 illustrate the hierarchical structure of the corporate structure of the organization, the shorter dashed lines represent the filtered flow of the all subscribers list from the corporate Business Unit 1910 through filters 1912, 1914 to the regional Business Units 1924, 1926 and further filtered flow of the all subscribers list through filters 1916, 1918, 1920, 1922 to the departmental Business Units 1928, 1930, 1932, 1934. The longer dashed arrow represents the flow of a filtered regional subscriber list from the North Regional Business Unit 1924 through filter 1918 to the corporate Business Unit 1910. In the illustrated embodiment, the subscription filters 1912, 1914, 1916, 1918, 1920, 1922, separate the subscribers list based on subscriber attributes at the regional and departmental level. The corporate Business Unit 1910 manages the all subscribers list and creates and manages all of the filters 1912, 1914, 1916, 1918, 1920, 1922. The regional Business Units 1924, 1926 produce templates for sales and marketing campaigns for use by the departmental Business Units 1928, 1930, 1932, 1934 and sends their filtered all subscriber lists through additional filters 1916, 1918, 1920, 1922 to the departmental Business Units 1928, 1930, 1932, 1934. In the embodiment illustrated in FIG. 18, the regional filters 1912 and 1914 each filter the all subscriber list based on multiple regional attributes of the subscriber one corresponding to the north vs. south regional attribute by which the regional Business Units are divided and the other dependant upon whether the subscriber is in the eastern part of the region, while the departmental filters 1916, 1918, 1920, 1922 further filter the filtered list received by each regional Business Unit 1924, 1926 based on a departmental attribute, illustratively sales vs. marketing.

A subscriber list must be created or subscribers must imported to the subscriber list before a message can be sent. The information stored about subscribers can be used to personalize the messages sent to subscribers and the landing pages that subscribers visit. In one embodiment of the disclosed system, method and user interface, subscriber filters may be defined by an authorized user which is a user that has an enterprise level account, is a member of the parent Business Unit and has the define subscriber filter permission enabled to perform this procedure. The authorized user defines the filter by clicking the Admin tab, clicking Business Units and Checking the checkbox next to the Business Unit for which a filter is to be created. The authorized user then, clicks the Define Subscriber Filter menu item and completes the filter criteria. The authorized user can add conditions and groupings as necessary. The results of this filter will become the all-subscribers list for the Business Unit. Unsubscribe options can be controlled on the Business Unit detail to control behavior of the entire unsubscribe options, and not the individual opt-out lists. Clicking the Save button saves the filter settings and returns the screen presented by the GUI to the Business Units workspace. Click the Cancel button the Cancel button returns the screen presented by the GUI to the Business Units workspace without saving changes.

Many enterprises utilize ESPs to carry out electronic mail campaigns to recipients who have expressed an interest in receiving Emails from the enterprise or exhibit demographics that make it likely that they would be interested in receiving Emails from the enterprise. Those recipients that have indicated a willingness to receive Emails from an enterprise are commonly considered to have opted-in to an Email campaign. Subscribers are those individuals who have opted to receive email communications from an enterprise. Thus, enterprises wishing to engage in Email marketing campaigns, at a minimum, store a valid email address for each subscriber in memory accessible to their enterprise system 14. Often when additional information regarding as subscriber is stored, this stored subscriber information is stored in a database or in some other data structure linking data with the subscriber to which the data relates. Enterprises may track additional pieces of information using profile attributes and preference attributes for a subscriber.

In one embodiment of the disclosed system and method, the user interface generated by the ESP server 40 allows enterprises to manage information regarding subscribers using lists. Enterprises can create as many or as few lists as necessary by interacting with the user interface. Enterprises can add subscribers to a list manually (individually) or by importing a collection of subscribers to a given list.

As enterprises gather additional information about their subscribers, they can also use that information to develop segments to the subscriber lists using a groups feature of the user interface.

When an enterprises wishes to have an ESP send emails on their behalf as part of an Email marketing campaign, the enterprise can choose the recipients by selecting the appropriate lists and/or groups.

The more data that an enterprise collects about its subscribers, the more targeted and personalized the enterprise can make its communications with the subscribers. To help consolidate what an enterprise knows about its subscribers, profile attributes can be created to manage demographic information, and preference attributes can be created to capture such information as the frequency with which the subscriber wants to receive information from the enterprise. Profile attributes offer great flexibility in allowing a variety of data to be captured and in controlling the type of data that is captured related to a subscriber. Preference attributes offer the simplicity of capturing ☐ yes or no ☐ information regarding a subscribers preferences (for example, does the subscriber want to receive emails in HTML format?). Once an enterprise has defined its attributes related to its subscribers, the enterprise can use the attributes to create groups and drive personalized and dynamic content.

Each of the plurality of enterprises for which the ESP provides Email campaign services is assigned an account. Utilizing this account not only can Emails be sent on behalf of the entire enterprise, but Email campaigns can be sent on behalf of individual or multiple business units of the enterprise. The subscribers for campaigns on behalf of individual or multiple business units will typically include fewer than all of the subscribers to all of the Email campaigns sent on behalf of the entity and or its business units.

The administration portion of the user interface provides all the tools a user with administrative access rights needs to manage account settings, user access rights, and configuration options.

The Enterprise tool is designed to help an enterprise manage users across the enterprise. The enterprise tool utilizes the concept of Business Units to help manage users across the enterprise. An Enterprise administrator designs an enterprise organizational chart, which consists of Business Units. For example, if the enterprises organizational structure is designed around geography, such as the Enterprise shown in FIGS. 2 and 3 the following Business Units might exist Asia Pacific (AP), Europe/Middle East/Asia (EMEA), and North America Sub-Business Units can be created under a Business Unit for a complex organizational structure. As shown, for example, in FIGS. 2 and 3 an enterprise having a North American Business Unit may have sub-Business Units Canada and/or United States. As many levels of Business Units and sub-Business Units as desired may be created in an enterprise's organizational chart.

An account administrator can ensure that all users are configured appropriately, using the administrative area of the application. An account administrator can also manage the users of channel member or lower Business Unit accounts.

While only a single enterprise level device 20, second tier level business unit devices 22 for each Business Unit in the second tier of the enterprise structure and third tier business unit devices 24 for each Business Unit in the third tier of the business unit structure are shown in FIG. 1, it should be under stood that multiple devices may be present and multiple users may have access to one or more devices at each level of the enterprise structure. User security is primarily a matter of deciding which rights a user should not have. To set up a user with full rights to every non-administrative area (emails and templates, subscribers, tracking, and libraries) all user permissions are left deselected. To create an administrator, the user must be provided with the Add Users to Account permission. Since each Business Unit may need to add subscribers, one or more business unit level administrators may be created at the enterprise level for each Business Unit.

As used herein, the phrase "attribute definition" refers to the characteristics of a field that an enterprise creates to hold subscriber data. For example, Zip Code may be an attribute with an attribute definition of a text field that can hold five characters. The phrase "attribute value" refers to the data entered in the attribute field for a subscriber. For example, 46204 may be a subscriber's attribute value for the Zip Code attribute.

In one embodiment of the disclosed system, method and user interface, the steps for creating a profile attribute and a preference attribute are the same. Profile attributes are created and accessed from the profile management workspace, and preference attributes are created and accessed from the preference management workspace.

The following steps are performed to add a new profile or preference attribute to an account: 1) In the navigation pane, click Subscribers; 2) In the Subscribers area of the navigation pane, click Profile Management or Preference Management. In one embodiment of the disclosed system and method, the user interface will include a left navigation window and the Profile Management and Preference Management nodes will display the Enterprise attributes. If an administrator or other person accessing the user interface via an enterprise level account type with permission to create attributes (i.e. "Create" permission for attributes) is creating a profile attribute, all profile attributes defined in the enterprise account appear in the profile management workspace on the right. If an enterprise level account with "Create" permission for attributes is creating a preference attribute, the preference management workspace on the right displays all preference attributes that are defined in the enterprise account; 3) In the profile/preference management toolbar at the top of the workspace, click Create Attribute, which brings up the New Attribute Properties dialog box. This Create Attribute button is only displayed for enterprise level account types with the "Create" permission for attributes. Similarly, a Delete button is only displayed for Enterprise level account types with the "Delete" permission for attributes; 4) Define the properties for this attribute. In one embodiment, an Attribute Properties Dialog Box is accessible to the user which provides details on the fields in this dialog box. Only an enterprise level account types with "Create" or "Update" permission can modify attributes. For Business.

Unit level account types, or enterprise level account types with insufficient permissions, these fields will be read-only. The attribute properties dialog box is where a profile attribute is defined and is used when creating and editing attributes. The dialog box for defining preference attributes shares the same basic fields as the dialog box for defining profile attributes. However, profile attributes have several more characteristics that can be defined; and 5) Click OK in the New Attribute Properties dialog box when done. This attribute is now available for use in defining groups, dynamic content, and personalized merge fields.

Profile/preference management is an advanced feature that allows a user to preview the Profile and Subscription Centers. The Profile Center is a web page that the application builds for a user where the user's subscribers can view and modify the data recorded about them and their subscriptions to communications.

In the Profile Center, subscribers see all of the attributes that are defined in your account and not set up as hidden. If the attribute is set up as read-only, the subscriber can see his or her value for that attribute but cannot change it. To ensure CAN-SPAM compliance for changes to the law that went into effect on Jun. 30, 2008, every Profile Center page now includes a global opt-out option.

To see what the Profile Center looks like to a subscriber, a user follows these steps: 1) In the navigation pane, click Subscribers; 2) In the Subscribers area of the navigation pane, click Profile Management or Preference Management; and 3) In the profile/preference management toolbar at the top of the workspace, click Preview Profile Center, which brings up the web page that subscribers will see. Attributes shown with a red asterisk in the Profile center are those that are defined in "as required". Attributes that are defined as "hidden" are not displayed. Attributes that are defined as "read-only" are not editable. If the Preview profile center is accessed from a Business Unit account type, the preview profile center page will display Enterprise attributes. Similarly, the Profile Center page displays Enterprise attributes, if a Business Unit account type is accessing the profile center. When a subscriber updates profile or preference data, the updated will be recorded in the _EnterpriseAttribute data extension.

The cornerstone of any email application is the subscriber. A subscriber is anyone, e.g. a customer, a prospect, an employee, a partner, etc., who has explicitly opted to receive email communications from an enterprise. When an Email is delivered, the user specifies who will receive the email by choosing from subscriber lists and groups.

A fundamental concept is the subscriber list. All of an enterprise's subscribers belong to the master All Subscribers list in the enterprise level account. As many subscriber lists as are needed to segment subscribers so that the enterprise can appropriately target email communications are created. Creating distinctive lists for different kinds of communications is important because subscribers will be able to choose which public lists from which to unsubscribe. Subscribers can also choose to unsubscribe from all communications. Subscribers can be added to lists by adding them individually or by importing a file containing subscriber data into a list. All subscribers should be added to the _EnterpriseAttribute data extension regardless of whether they are imported at the Enterprise or Business Unit level. All other functionality will remain in place, the System will continue to add records to Members_ and Subscriber, tblListSub, tblListSubDetail. In addition, checks on GlobalUnsub and ListDetective will still be performed. A subscriber can belong to more than one list.

In one embodiment of the disclosed system and method the user interface permits subscriber listings which display subscribers based on the _EnterpriseAttribute data extension. As to each subscriber, a subscriber Properties page is displayed with all fields on this page being read-only if the user does not have permission to "Create" or "Update" subscribers or attributes. Both the Enterprise and Business Units can modify subscribers if they have the appropriate permissions.

The groups feature allows an enterprise to use common direct-marketing testing tactics to increase the response rates on its email communications. Using groups, the enterprise can create samples of its subscriber lists for testing purposes. By creating two or more targeted segments, the enterprise can easily test and optimize message formats, subject lines, and content. The enterprise can form groups based on profile or preference attributes, random sampling, or constant-interval sampling. A subscriber can belong to more than one group.

In one embodiment of the disclosed system, method and user interface, data class models are utilized to facilitate storage of data related to Email campaigns, entities and subscribers. Data class models include custom objects that support flexible naming of system object extensions. Custom object extensions are named in the following format _<ObjectTypeName> where ObjectTypeName is the name of the API object being extended (e.g. _EmailSendDefinition). The system supports an extension of _EnterpriseAttribute to map to the Subscriber API object. Profile attributes are pulled from the _EnterpriseAttribute data extension in the system. Subscriber data profile values are pulled from the _EnterpriseAttribute data extension.

A Create Group Wizard is provided to translate rule definitions into an xml fragment that can be utilized by a Filter Engine. Rules may be built based on profiles and preferences. Data filters provide far more sophisticated list segmentation than was previously available with the groups feature. In addition to subscriber lists, data filters may be utilized to segment other types of lists that utilize object types having data extensions. Data filters can use subscriber attributes to segment lists based on features of the subscriber or data filters can use measures to segment lists based on subscriber behavior. In one embodiment of the disclosed system, method and user interface, a data filter is utilized to control access of each individual Business Unit to subscriber information contained in the All Subscribers list of the enterprise. In one embodiment of the disclosed system, method and user interface the filter utilized to control access of each individual Business Unit to subscriber information contained in the All Subscribers list of the enterprise is stored and behaves similar to other filters created in a Data Filter definition. The only difference is that those created from the "Create Group Wizard" will not have inner groupings. The table the data filter engine queries to implement the filter is the _EnterpriseAttribute table.

An _EnterpriseAttribute Table that contains the subscriber attributes for all subscribers in the Enterprise is shown, for example, in FIG. 8. It is named with the following convention C<ClientID>._EnterpriseAttribute.

In large enterprises, the ownership of lists and subscribers can be confusing. In one embodiment of the disclosed system, method and user interface, every subscriber will exist at the parent account level. The subscribers are marked with the correct attribute data so that child accounts can see and send electronic communications to their own subscribers. For example, if the western division of an enterprise imports a list of subscribers, the system uploads that list to the parent account level and marks the subscribers as being associated with the western division. Using this method of subscriber storage allows greater control in giving subscribers the option to opt-in and opt-out of some or all of an enterprise's publications.

The disclosed system and method facilitates management of subscriber information and access to such information in a more efficient manner across the enterprise including all of the Business Units of the enterprise. In one example of managing subscribers across an enterprise comprising multiple Business Units, a database 42 including all subscribers to one or more Email campaigns of the enterprise is maintained at, or only fully accessible to, the enterprise only at the enterprise, top or corporate level Business Unit.

Figure 2:
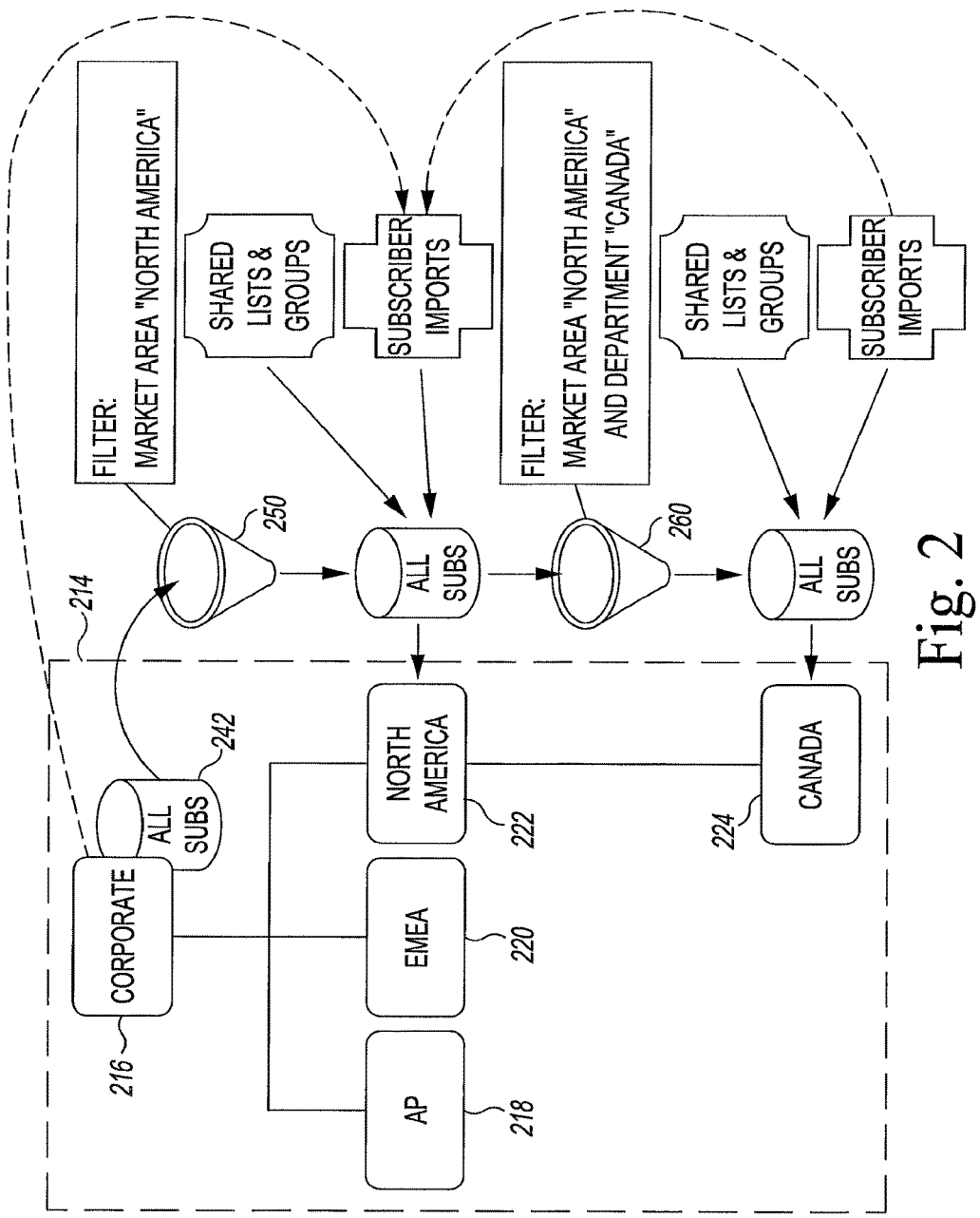
FIG. 2 is diagram of an entity and business units organized in a tiered structure indicating how an all subscribers list accessible at an entity level is filtered for presentation to first and second tier business units and also indicating Shared lists and groups and subscriber imports may be shared between different levels of the enterprise.
Figure 3:
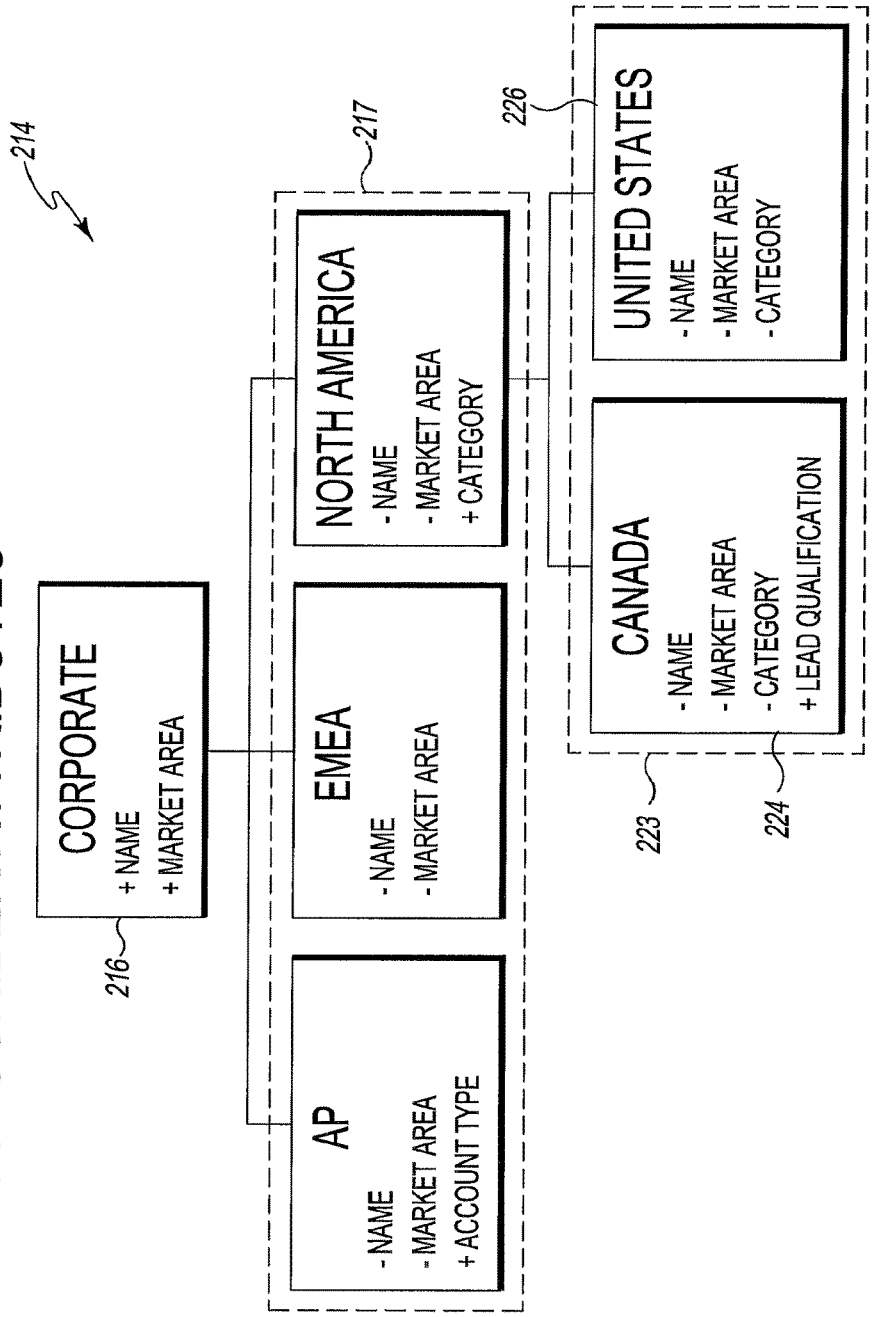
FIG. 3 is diagram of an entity and business units organized in a tiered structure indicating different subscriber attributes of the enterprise level and business unit level that may be utilized to filter access to the all subscribers list for each business unit.

As shown for example in FIGS. 2 and 3, an enterprise 214 may be a corporation with a top enterprise or corporate level 216 and second level or tier business units 217 for various market areas, e.g. the Asian Pacific (AP) business unit 218, the Europe/Middle East/Africa business unit 220, and a North American business unit 222. Each second tier business unit 217 may be further subdivided at a third level 223 of the corporate tree structure. For instance, in addition the to Canadian business unit 224 shown, for example, in FIGS. 2 and 3, at the level below the North American business unit 222, the North American business unit 222 may include additional business units such as, for example a United States business unit 226, shown for example, in FIG. 3, a Mexican business unit, a Panamanian business unit, etc. Additionally each of the Asian Pacific (AP) business unit and the Europe/Middle East/Africa business unit may include business units organized thereunder at lower levels of the enterprise tree structure.

The enterprise system 14 may include an enterprise level system 20, one or more second level business unit systems 22, and one or more third level business unit systems 24, as shown for example in FIG. 1. The enterprise level system 20 includes an administrator device and memory. Information related to all of the subscribers of the enterprise Email marketing campaigns is stored in memory accessible to the enterprise level system, such as memory 42, Thus information related to all subscribers is stored to be accessible at the enterprise level allowing an administrator to define a subscriber filter for individual business units which may be based on attributes associated with the subscriber and/or the business unit. By utilizing the data extension framework to store attributes system performance may be improved.

The disclosed system and method allow the enterprise to filter the "All Subscribers" list 242 available to the enterprise level users so that only subscribers that meet the defined filter criteria are displayed to business unit level users. In one embodiment of the disclosed system, method and user interface, administrators interacting via the administrator device with the User Interface generated by the server of the ESP will be provided with an action presented on a business unit listing page to allow the user to define the subscriber filter for a Business Unit. If the administrator user has "Define subscriber filter" permission on the Business Unit object type accesses the business units listing page a Define Subscriber Filter button is displayed on the tool bar of the page. The Define Subscriber Filter button is enabled when one Business Unit is selected. When clicked, the interface navigates to the Business Unit Subscriber Filter page. This page lists the filter criteria for filtering subscribers to the selected Business Unit and allows the user to define the criteria based on the subscriber attributes. When saved, the system should set the filter criteria for the specified Business Unit.

The user interface presented to the administrator at the enterprise level may also include breadcrumb links such as a Business Unit Listing link to the Business Unit Listing page and a Business Unit Details link to the Business Unit Details page.

The text should be the name of the Business Unit. The user interface presented to the administrator at the enterprise level may also include a breadcrumb label with the text "Subscriber Filter". A toolbar presented on the Business Unit Subscriber Filter page of the user interface includes a Save button that saves the specified filter criteria for the Business Unit. If the "Save" action is initiated and the save is successful, the user interface navigates to the Business Unit Listing page and displays a notification to indicate the save was successful. The toolbar presented on the Business Unit Subscriber Filter page of the user interface includes a Cancel action that when executed cancels any changes and navigates to the Business Unit Listing page.

A new class model is developed to support the business unit filter definition. A business unit filter definition table is stored in memory that contains filter criteria to determine which subscriber's information is accessible to which Business Unit. The business unit filter definition table may include such data as a ClientID, Enterprise ID, FilterDefinitionXML, SQLStatement, CreatedDateUTC, CreatedBy, ModifiedDateUTC, ModifiedBy and a Stamp. In one embodiment of the disclosed system, method and user interface, the Client ID does not allow null values, is of the data type bigint and is utilized for DTU to identify the client. EnterpriseID does not allow a null value and is of data type bigint and identifies the enterprise. An example of a BusinessUnitFilterDefinition Table that contains the filter criteria to determine the subscribers that are accessible by the business unit is shown, for example, in FIG. 9.

As shown, for example, in FIG. 2, a second tier filter 250 for access to subscriber information contained in the All Subscribers list 242 at the corporate level 216 requires <Market Area="North America">, This filter 250 allows only the North America business unit 222 to access information in the All Subscribers list 242 that relates to subscribes having an attribute market that has a value North America. A third tier filter 260 for access to subscriber information contained in the All Subscribers list 242 at the corporate level 216 requires <Market Area="North America"> and <Department="Canada">. This filter 260 allows only the Canada business unit 224 to access information in the All Subscribers list 242 that relates to subscribes having an attribute market that has a value North America and an attribute Department that has a value Canada.

Enterprise users must be able to share their emails, templates, and other items in their account with their child accounts. The disclosed system, method and user interface provides a user interface that facilitates making entities "sharable" within the system. This allows an Enterprise level user to share an entity with other users in the Enterprise. The owner can also specify the permissions the users will have on the shared entity.

Figure 5:
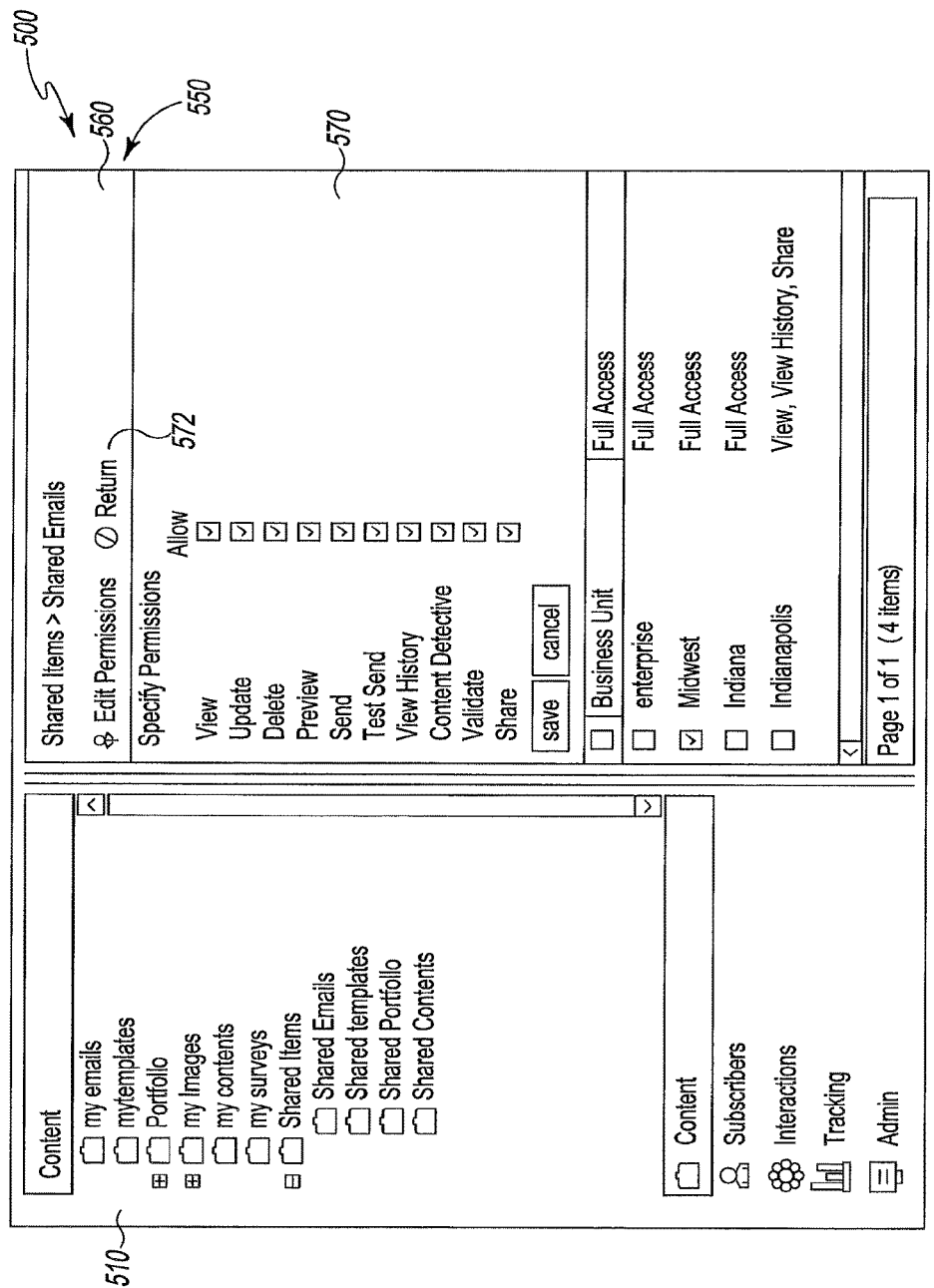
FIG. 5 shows a screen shot of a shared page of a graphical user interface.

FIG. 5 shows one embodiment of a shared page of a graphical user interface.

In order to implement sharing a SystemDB.dbo.PartnerAPIObjectType is included in the table and a PartnerAPICommon.ObjectTypes enum object type is included in the enumerator list if it does not exists. The enumerator list may appear at (Application\Core\Enumerations.cs). The entity table includes an ObjectID column of type uniqueidentifier 1 and an OwnerID column of type bigint. Middle-tier objects include both ObjectID and OwnerID properties. A view is created that is the default retrieve that includes the ObjectID and OwnerID in the view. Each time a new category is created, a "Shared" category is created along with the standard category. For example, when the "my templates" category is created, a "Shared Templates" category is created as well.

As shown, for example, in FIG. 5 the shared GUI 500 Includes a Tree Navigation pane 510 and a workspace 550. The TurboNavTree.ascx (Interface\Presentation\Controls\TurboTree) includes shared categories under the "Shared Items" root category so that "Shared Items" appears as root item in the Tree navigation pane 510 when the Content Tab has been selected. When the shared items root folder has been expanded, the Tree Navigation pane 510 lists folders for the various types of entities or items that may be shared. Clicking on one of the sharable entities folders causes the work space 550 to display the appropriate listing page for the sharable entity. In FIG. 5, the Shared Emails folder has been click upon and the workspace displays the Shared Emails listing page 560 sharable content. The ObjectPermissionController (Interface\UICore\Controllers) retrieves the correct permissions ids for the selected shared entity and the listing page 560 displays a "Permissions" toolbar item 572. The edit permissions button should be disabled if the user does not own the entity since users must own the item to share it.

The select procedure returns the entities by category id. For a shared category, this procedure returns all the entities that have been shared to the user or business unit where the view permission has been granted (specified in dbo.SharedObjectPermission). In one embodiment of the disclosed system and method, entities are shared to all Business Units by default. Therefore, if no rows are found for the entity in the SharedObjectPermission table, assume it is shared to everyone.

A data population script for Object ID Column that has been optimized for large tables is shown, for example, in FIG. 10.

Among the entity or item types that may be shared are Emails, Content Areas and Surveys. In order to share Emails, the account class creates a "Shared Email" folder when an enterprise account is created. Thus, a shared Email folder will exist in the Enterprise account.

In order to implement sharing of Emails, the Email Class (dbo.tblEmails) includes a bit column "IsShared" to designate whether an Email is to be shared or not. If the email is shared, the class will use the EnterpriseID property on ETPrincipal, if the Email is not shared the class will use the MemberID property on the ETPrincipal, The TurboNavTree includes a node for the "Shared Emails" folder which is a child node of the "Shared Items" root node in the Content section.

The Email Listing page of the user interface supports shared emails and includes a "Permissions" toolbar action if viewing a shared category. This toolbar action is only enabled if the logged in user is the Owner of the email. Only the Owner of the email should be able to delete it. The email listing page retrieves the shared emails contained in the shared email folder by looking at the SharedObjectPermissions table to determine whether the emails in the category have been shared with the current Business Unit. The user is not permitted to change folders for shared emails.

In order to implement sharing of contents, the Account class creates a "Shared Contents" folder when an enterprise account is created so that a shared contents folder exists in the Enterprise account. The content Area Class (dbo.tblContents) includes a bit column "IsShared". If the content area is shared, the class will use the EnterpriseID property on ETPrincipal, if the content is not shared the class will use the MemberID property on the ETPrincipal The TurboNavTree includes a node for the "Shared Contents" folder which is a child node of the "Shared Items" root node in the Content section.

The Content Listing page of the GUI supports shared content areas and includes a "Permissions" toolbar action if viewing a shared category. This toolbar action should only be enabled if the logged in user is the Owner of the content area. Only the Owner of the email should be able to delete it. The Content Listing page of the GUI retrieves the shared content areas contained in the shared contents folder by looking at the SharedObjectPermissions table to determine whether the content areas in the category have been shared with the current business unit. The user is not permitted to change folders for shared content. Anyone other than the owner is prohibited from deleting the content area.

The Retrieve Content page supports shared content areas and shared surveys and includes a "Select Folder" dialog that allows the user to retrieve "my E" items (content areas, surveys, portfolio) into the email as well as "shared" items.

In order to implement the sharing of surveys, the Business Rule Extension is configured to create a "Shared Surveys" extension when turned on and delete this folder when turned off. The Survey Listing page supports shared surveys and includes a "Permissions" button if viewing a shared category. This button should only be if the logged in user is the Owner of the survey. Only the Owner of the survey should be able to delete it. The Survey Listing page retrieves the shared surveys contained in the shared surveys folder by looking at the SharedObjectPermissions table to determine whether the surveys in the category have been shared with the current business unit.

To facilitate the sharing of entities, Categories Class types include for, the CategoryType enum, SHARED_EMAIL, SHARED_CONTENT, and SHARED_SURVEY to support sharing of entities. The ObjectPermissionController class accounts for new shared category types and permissions. The Send Wizard is configured so that the "Choose Email" step of the send wizard supports "Shared Emails".

Legislation has been enacted in many countries in an effort to protect the privacy of Email recipients and to control Email marketing programs. In the United States, the Controlling the Assault of Non-solicited Pornography and Marketing Act of 2003 ("CAN-SPAM Act of 2003" or "CAN-SPAM Act") places certain requirements on bulk Email campaigns. Among the requirements of the CAN-SPAM Act is the requirement that a recipient be provided the option to indicate their desire to no longer receive Emails from the enterprise, i.e. to opt-out of future Email campaigns.

Some Email campaigns send Emails to recipients who have not necessarily indicated an interest to receive Emails from the enterprise, however, in order to be compliant with the CAN-SPAM Act, each such Email sent as part of such a campaign must provide clear instructions on how a recipient can elect to unsubscribe from receiving further Emails from the recipient, i.e. instructions on how to opt-out of the Email campaign. While the disclosed system, method and user interface are described as being implemented with regards to subscribers who have opted-in to an Email campaign, it is within the scope of the disclosure for certain aspects of the disclosed system and method to be implemented and utilized by enterprises and/or bulk Email facilitators that send unsolicited Emails to recipients as part of a bulk mailing campaign and the terms subscriber and ESP should be understood as including such recipients and bulk Email facilitators where appropriate.

In one embodiment of the disclosed system, method and user interface, the user interface presents publication lists. Publication lists help manage subscribers' unsubscribe or opt-out actions. Having a separate publication list for each communication type (Newsletter, Weather Alerts, Coupons, etc.) enables an opt-out request from one publication type without unsubscribing that person from all previously subscribed to publications. If only one publication list is used for all of a subscriber's communications, and if that person opts out of one publication, that subscriber will be opted out automatically from all publications.

In one embodiment of the disclosed system, method and user interface, a publication list is atoll that may be utilized for each category of message content available in the enterprise account. For example, newsletters, advertisements, and alerts may be sent. Each of these types of messages is a different category, and thus, a separate publication list for each category may be created. When a newsletter is sent, it may be associated with the newsletter publication list to identify to the system what kind of content is inside the publication. Publication lists may be utilized to allow subscribers to opt-out of sends to data extensions. Publication lists make it possible for subscribers to opt-out of a category of sends without opting out of all messages from an organization.

In one embodiment of the disclosed system, method and user interface, for email communications, the system uses the publication list exclusively to prevent sending to subscribers who have opted-out. For SMS communications, the system adds opted-in subscribers to the list of people to receive the SMS message and also prevents sending to subscribers who have opted-out.

As indicated above, publication lists can be utilized with email and SMS (short message service) communications. Publication lists facilitate honoring a subscriber's request to opt-out of one publication type without unsubscribing from all previously subscribed-to publications. Publication lists can be utilized to filter the audience of an email send, to increase the likelihood that publications are sent to the subscribers who want to see them. Publication lists can be utilized to demonstrate and adhere to regulatory compliance to CAN-SPAM laws. Publication lists can be utilized for each communication type, such as newsletter, weather alerts, and coupons. Publication list can be utilized to control who receives particular communications from a company. Publication lists can be shared between parent and child Business Units, as shown, for example, in FIG. 20.

Figure 20:
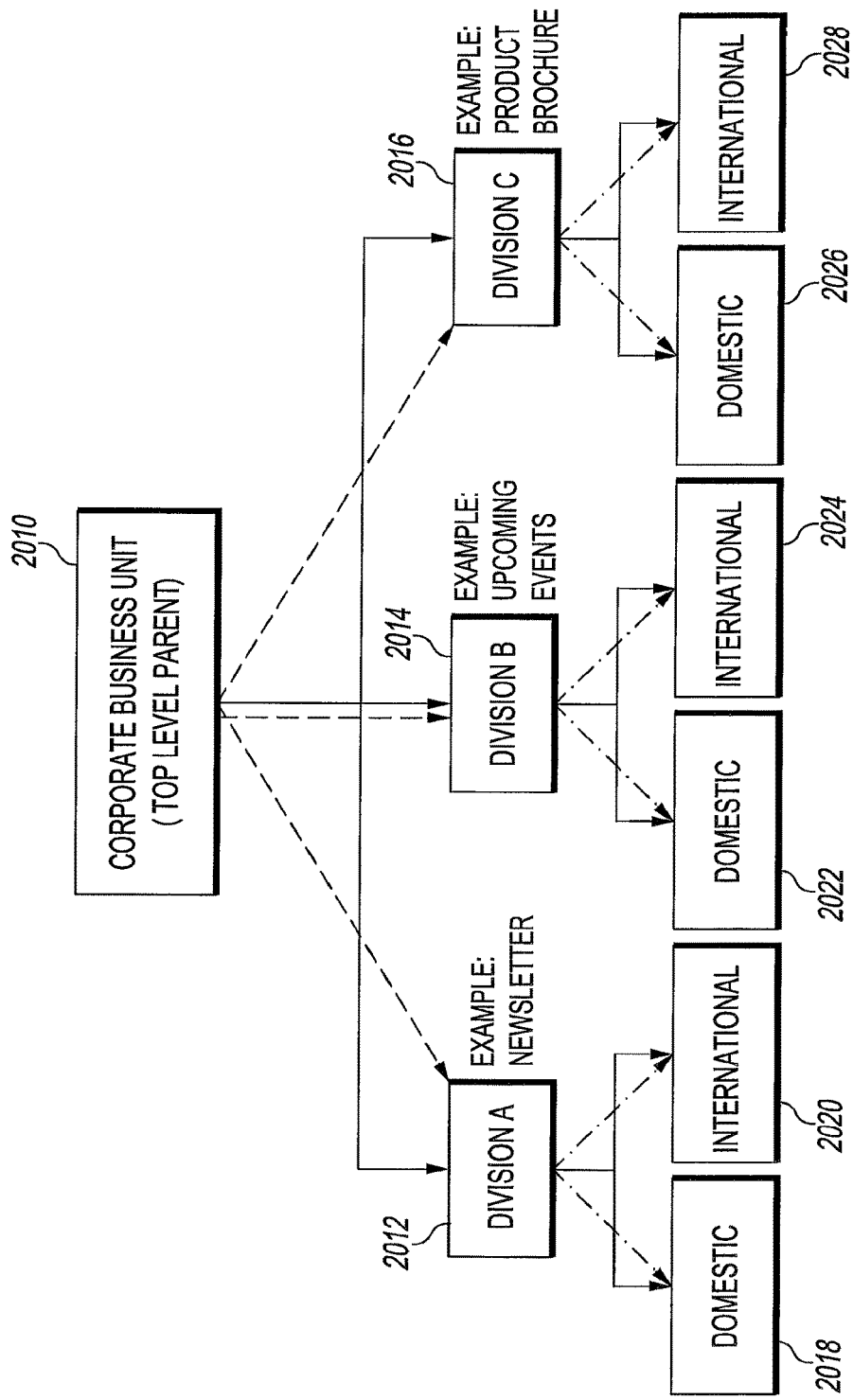
FIG. 20 is a diagrammatic view illustrating how a parent, enterprise level or corporate level Business Unit can manage a shared opt out publication list for all divisions of the enterprise represented by divisional Business Units and domestic and international Business Units of each division.

FIG. 20 illustrates how a parent, enterprise level or corporate level Business Unit 2010 can manage a shared opt out publication list for all divisions of the enterprise represented by divisional Business Units 2012, 2014, 2016 and domestic and international Business Units 2018, 2020, 2022, 2024, 2026, 2028 of each division. In the diagram, the solid arrow extending between Business Units 2010, 2012, 2014, 2016, 2018, 2020, 2022, 2024, 2026 illustrate the hierarchical structure of the corporate structure of the organization, the shorter dashed arrows represent the sharing of the publication list from the corporate Business Unit 2010 to the divisional Business Units 2012, 2014, 2016. The longer dashed arrows represent the flow of divisionally updated publication lists from each divisional Business Unit 2012, 2014, 2016 to its domestic and international Business Units 2018, 2020, 2022, 2024, 2026, 2028 of each division. The publication list is generated from subscriber communication that contains a list of publications they either want or do not want to receive. The corporate Business Unit 2010 manages the opt out publication list for all divisional Business Units 2012, 2014, 2016 and shares the publication list with the divisional Business Units 2012, 2014, 2016 to help ensure that publications are not sent to subscribers listed on the opt out publication list. The divisional Business Units 2012, 2014, 2016 compares the opt out publication lists with the divisions subscriber list and shares the updated list their respective domestic and international Business Units 2018, 2020, 2022, 2024, 2026, 2028.

In one embodiment of the disclosed system, method and user interface, publication lists may be shared or unshared items. To share a publication list, it must be created it in a Shared Items folder. An authorized user can create a publication list by clicking the Subscribers tab, clicking my subscribers and click my publication lists to open the my publication lists workspace. In the my publications list workspace, the authorized user clicks the Create Publication List menu item to open a Create Publication List wizard. In the Create Publication List wizard, the authorized user clicks the Next button to open the Identify Publication List workspace. The authorized user then provides a name and description for the publication list. The provided name and description appear in the Available Publications section of the subscription center. The authorized user then clicks the Next button to open the Place Publication List workspace. In the Place Publication List workspace the authorized user clicks the folder in which the publication list is to be stored and clicks the Finish button.

If it is desired that the publication list be shared, the authorized user selects the Shared Items folder under the Subscribers tab to share the publication list. Optionally, If the publication list is shared, the authorized user may select the Permissions menu item and set roles and permissions for the publication list. Publication lists may be shared from parent Business Units to child Business Units. Therefore, the master publication list that controls opted-out subscribers can be used to compare to subscriber lists, which ensures that only the subscribers who opted-in for the publication receives the publication.

Figure 6:
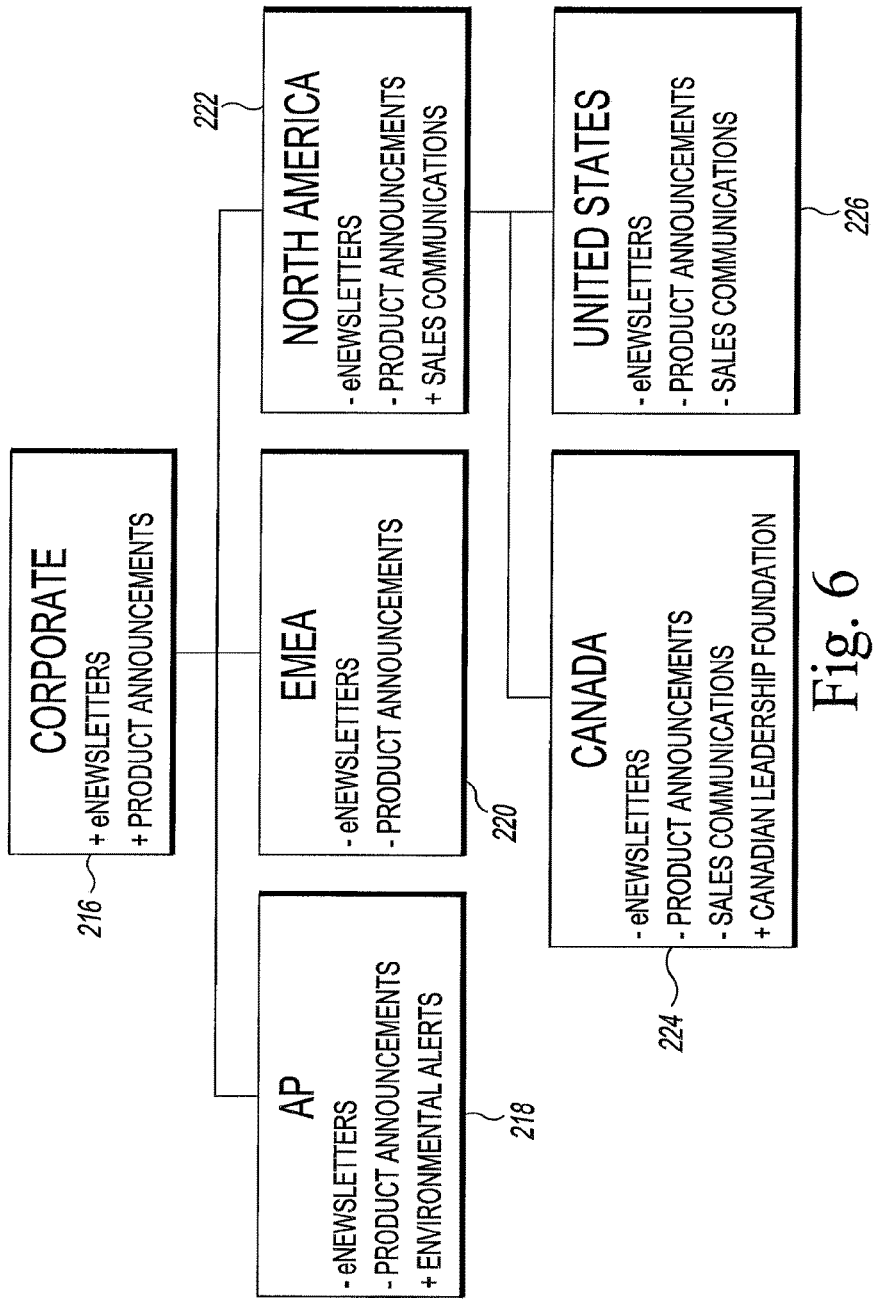
FIG. 6 is a diagram of an entity and business units organized in a tiered structure indicating various publications that might be sent by, or on behalf of, an entity or its business groups from which a recipient may opt-out from receiving.

FIG. 6 is a diagram indicating various publications that might be sent by, or on behalf of, an entity or its business groups from which a recipient may opt-out from receiving.

With Email, publication lists let a user create communication specific opt-out categories that transcend individual lists. For example, an enterprise may have three different data extensions that store the list for its newsletter. However, an enterprise may want its subscribers to be able to opt out of the Newsletter category, not just a specific data extension. With publication lists, the enterprise can associate many sends and sources with the same Newsletter category.

One embodiment of the disclosed system and method allows an enterprise to manage subscribers in a more efficient manner especially when the ESP is not the database of record for unsubscribes. The disclosed system and method allows enterprises to define and import into opt-out lists. The send process allows opt-outs to be associated to the send and excluded from the selected audience. Users are allowed to share publication lists across the Enterprise.

A publication list business rule, PUBLICATION_LIST, enables access to publication lists by providing a Publication List Business Rule Extension. The extension creates a shared category for "Shared Publication Lists" when turned on, and deletes the category when turned off. The ClientID of this category will be the EntepriseID since shared categories exist at the Enterprise level.

Unsubscribe Behavior Configurations indicate whether unsubscribes will be handled at the Enterprise level or the Business Unit level. The default behavior should be to unsubscribe from the Enterprise.

To facilitate handling unsubscribes utilizing publication lists, the user interface generated by the server of the ESP includes in the subscriber section of LeftNAV or Navigation tree screen nodes for "Shared Items" and Shared Publication Lists". These categories will have category types of "shared_data" and "shared_publication". The root Shared Items folder should not be editable or extendable. The "Shared Publication Lists" folder should not but editable, but should be extendable. These folders should be available only to account types with the "PUBLICATION_LIST" business rule. The nodes reside under the "my subscribers" as follows:
  my subscribers
  All Subscribers
  my lists
  my publication lists
  Shared Items
  Shared Publication Lists The Publication List Listing page of the user interface supports shared publication lists and includes a "Permissions" toolbar action if viewing a shared category. This toolbar action should only be enabled if the logged in user is the Owner of the publication list The Publication List Listing page also includes an "Import" toolbar action for importing subscribers into the publication list. This action should always be enabled. The Publication List Listing page should display only those entities that have been shared with "View" permission on the item in any shared list presented by looking at the SharedObjectPermission table to determine whether the publication lists in the category have been shared with the current business unit.

A Subscriber Publication List Wizard page supports shared publication lists. The "Place Publication List" step should display "Shared Publication Lists" root folder and subfolders when creating a shared list. In the Send Wizard, if the PUBLICATION_LIST business rule is on, the Choose Recipients step includes a section for selecting an opt-out list having instructional text "Select one publication list below:". The tree will be populated with the publication lists belonging to the business unit, as well as any shared with the business unit. The publication list is required, and validation should ensure that only one publication list is selected. An AudienceItem object is included in the Job.SupressionLists array for the publication list. AudienceItem.ListID will contain the publication list id. AudienceItem.DataSourceType will contain the OptOutList data source type.

If the PUBLICATION_LIST business rule is on, the Send Definition Audience page will display "my publication lists" and "Shared Publication Lists" nodes in the audience tree. Only those shared publication lists that have been shared with the business unit should be visible.

On the Business Unit Details page of the GUI an "Unsubscribe Settings" section appears if the "PUBLICATION_LIST" business rule is on. This section contains a set of radio buttons indicating whether unsubscribes should be at the Enterprise level or Business Unit level, One radio button may indicate "Subscribers will be unsubscribed from all business units in the Enterprise" while the other radio button may indicate "Subscribers will be unsubscribed from this business unit only".

Based on the jobID the ESP system 12 determines if publication list id is tied to the job in the querystring. If a publication list is tied to the job, the system inserts a record in SubscriberOptOut table with the SubscriberID and ListID. The system determines the behavior for an unsubscribe based on the client configuration for unsub behavior. If an unsubscribe should occur at the Enterprise level, the subscriber is unsubscribed from Members_. If the unsubscribe should occur at the Business Unit level, the subscriber is added to SubscriberOptOut table with the SubscriberID and ClientID (Business Unit ID).

As shown, for example, in FIG. 7, The Subscription Center page 700 of the GUI shows all the publication lists for the Business Unit, as well as those shared with the Business Unit, If a subscriber opts-out, records will be added to SubscriberOptOut table with the SubscriberID and ListID of the publication. Subscriptions to standard lists will continue to be honored as well.

The import process for publication lists requires Emails address and/or SubscriberKey to be known depending on the client configuration. Additional attributes will not be required. If the subscriber does not exist in Members_, a record will be added to Members_, Subscriber, tblListSub, tblListSubDetail. In the SubscriberList, the Save method sets the ClientID as the EnterpriseID if it is a shared publication list. The Business Unit class supports the new UnsubscribeBehavior property. The Category classes support category types of "SHARED_DATA" and "SHARED_PUBLICATION". The DataSourceType Enum includes an item to reflect the OptOutList type. The SendDefinitionListType Enum includes an item to reflect the new OptOutList type.

An example of a data model table that contains both Business Unit level unsubscribes and publication list opt-outs, is shown, for example, in FIG. 11. A column for a business unit table that facilitates managing opt-out requests utilizing publication lists is shown, for example, in FIG. 12 The column indicates whether subscriber unsubscribe requests are recorded at the Enterprise or Business Unit level. A column for a tblLists Table that facilitates managing opt-out requests utilizing publication lists is shown, for example, in FIG. 13 that specifies the owner of the publication list. Only the owner of the publication list will be able to grant/deny access of a shared publication list to specific Business Units. In one embodiment, this column is nullable and may be populated by a script based on the ModifiedBy data.

The DataSourceType Table includes a record to support opt-outs, with the following data:
  DataSourceTypeID=6
  Name=OptOutList
  Description=An opt-out publication list data source The Send Definition ListType Table includes a record to support opt-outs, with the following data:
  DataSourceTypeID=6
  Name=OptOutList
  Description=An opt-out publication list data source The spGetCategoryChildren2 Procedure returns result sets for "shared_publication" categories which account for any instance level permissions on specific lists (i.e. if the owner has denied "View" permission on a specific shared publication, it should not be returned in the result set.)

The SendDefinitionListTypeEnum includes an element for OptOutList. One example of such an element is:

```
<simpleType name='SendDefinitionListTypeEnum'>
<restriction base='xsd:string'>
<enumeration value='SourceList'></enumeration> <enumeration
value='ExclusionList'></enumeration> <enumeration
value='DomainExclusion'></enumeration> <enumeration
value='OptOutList'></enumeration> </restriction>
</simpleType>
```

The DataSourceTypeEnum includes an element for OptOutList. One example of such an element is:

```
<simpleType name='DataSourceTypeEnum'>
<restriction base='xsd:string'>
<enumeration value='List'></enumeration> <enumeration
value='CustomObject'></enumeration> <enumeration
value='DomainExclusion'></enumeration>
<enumeration value='SalesForceReport'></enumeration>
<enumeration value='SalesForceCampaign'></enumeration>
<enumeration value='FilterDefinition'></enumeration> <enumeration
value='OptOutList'></enumeration> </restriction>
</simpleType>
```

Although the description of the disclosed system, method and user interface has generally focused on implementations wherein an enterprise utilizes an Email Service Provider to send Email messages on behalf of the entire enterprise and the enterprise is required to obtain an account with the ESP so that an interface generated by the server of the ESP can display screens on various devices 20, 22, 24 accessible by various Business Units within the enterprise, the invention disclosed herein should not be limited to such implementation. It is within the scope of the disclosure for other forms of electronic messaging to be sent utilizing the disclosed system, method and user interface.

Additionally, it is within the scope of the disclosure for those portions of the system indicated as being portions of the ESP subsystem to be implemented within the enterprise system.

Although the invention has been described in detail with reference to certain preferred embodiments and specific examples, variations and modifications exist within the scope and spirit of the invention as described and as defined in the following claims.

What is claimed is:

1. A computerized method for controlling access within an enterprise to recipient information, the method comprising:
creating a master subscriber list in a database, the master subscriber list comprising a plurality of recipients and being accessible by an enterprise level account associated with an enterprise level device;
creating, under a control of a second level device, a second subscriber list in the database, the second subscriber list being accessible by the enterprise level account and a second account associated with the second level device, the second subscriber list being created by filtering the plurality of recipients in the master subscriber list based on at least one data criteria;
authorizing the second account to design at least one electronic message within a message campaign for sending to the plurality of recipients on the second subscriber list;
sending the at least one electronic message to the plurality of recipients on the second subscriber list; and
generating a user interface configured to allow an electronic message system to produce a response to an unsubscribe request from at least one of the plurality of recipients in the second subscriber list, the response selectable between causing the electronic message system to remove the at least one of the plurality of recipients in the second subscriber list from the master subscriber list and causing the electronic message system to remove the at least one of the plurality of recipients in the second subscriber list from the second subscriber list.

2. The method of claim 1, further comprising:
creating a third subscriber list in the database, the third subscriber list being accessible by the enterprise level account and a third account, but not accessible by the second account, the third subscriber list being created by filtering the plurality of recipients in the master subscriber list based on a second data criteria;
authorizing the third account to design a second electronic message within a second message campaign for sending to the plurality of recipients on the third subscriber list; and
sending the second electronic message to the plurality of recipients on the third subscriber list.

3. The method of claim 2, further comprising authorizing the third account to design electronic messages within the second message campaign for sending to the plurality of recipients on the second subscriber list, wherein the second subscriber list is accessible by the third account.

4. The method of claim 1, wherein the at least one data criteria is a demographics information.

5. The method of claim 1, further comprising:
receiving the unsubscribe request from the at least one of the plurality of recipients in the second subscriber list, wherein the unsubscribe request comprises an indication that the at least one of the plurality of recipients in the second subscriber list desires to no longer receive any electronic messages; and
removing the at least one of the plurality of recipients from the master subscriber list.

6. The method of claim 1, wherein the database includes information associated with each of the recipients on the master subscriber list indicating that at some time in the past a willingness of each of the recipients on the master subscriber list to receive electronic messages as a part of an electronic message campaign.

7. The method of claim 1, wherein the enterprise account is associated with a top level business unit of an enterprise and the second account is associated with a second level business unit of the enterprise.

8. A system for controlling access within an enterprise to recipient information, the system comprising:
a database, the database configured to receive a master subscriber list comprising a plurality of recipients, to authorize an enterprise level account associated with an enterprise level device to access the master subscriber list, to create, under a control of a second level device, a second subscriber list by filtering the plurality of recipients in the master subscriber list based on at least one data criteria, and to authorize the enterprise level account and a second account associated with the second level device access to the second subscriber list;
a server configured to authorize the second account to design at least one electronic message within a message campaign for sending to the plurality of recipients on the second subscriber list, to send the at least one electronic message to the plurality of recipients on the second subscriber list, and to generate a user interface configured to allow an electronic message system to produce a response to an unsubscribe request from at least one of the plurality of recipients in the second subscriber list, the response selectable between causing the electronic message system to remove the at least one of the plurality of recipients in the second subscriber list from the master subscriber list and causing the electronic message system to remove the at least one of the plurality of recipients in the second subscriber list from the second subscriber list.

9. The system of claim 8, wherein the database is further configured to create a third subscriber list by filtering the plurality of recipients in the master subscriber list based on a second data criteria, and to authorize the enterprise level account and a third account, but not the second account, to access the third subscriber list.

10. The system of claim 9, wherein the server is further configured to authorize the third account to design a second electronic message within a second message campaign for sending to the plurality of recipients on the third subscriber list, and to send the second electronic message to the plurality of recipients on the third subscriber list.

11. The system of claim 8, wherein the at least one data criteria is a demographics information.

12. The system of claim 8, wherein the server is further configured to receive the unsubscribe request from the at least one of the plurality of recipients in the second subscriber list, the unsubscribe request comprising an indication that the at least one of the plurality of recipients in the second subscriber list desires to no longer receive any electronic messages, and to remove the at least one of the plurality of recipients from the master subscriber list.

13. The system of claim 8, wherein the database includes information associated with each of the recipients on the master subscriber list indicating that at some time in the past a willingness of each of the recipients on the master subscriber list to receive electronic messages as a part of an electronic message campaign.

14. The system of claim 8, wherein the enterprise level account is associated with a top level business unit of an enterprise and the second account is associated with a second level business unit of the enterprise.

15. The method of claim 1, further comprising:
receiving the unsubscribe request from the at least one of the plurality of recipients in the second subscriber list based at least in part on the at least one electronic message; and
removing the at least one of the plurality of recipients in the second subscriber list from the second subscriber list.

16. The method of claim 2, further comprising:
receiving an unsubscribe request from at least one of the plurality of recipients in the third subscriber list based at least in part on the second electronic message; and
removing the at least one of the plurality of recipients in the third subscriber list from the third subscriber list.

17. The system of claim 8, wherein the server is further configured to receive the unsubscribe request from the at least one of the plurality of recipients in the second subscriber list based at least in part on the at least one electronic message and to remove the at least one of the plurality of recipients in the second subscriber list from the second subscriber list in the database.

18. The system of claim 10, wherein the server is further configured to receive a second unsubscribe request from at least one of the plurality of recipients in the third subscriber list based at least in part on the second electronic message and to remove the at least one of the plurality of recipients in the third subscriber list from the third subscriber list in the database.

* * * * *